US011124185B2

(12) United States Patent
King et al.

(10) Patent No.: US 11,124,185 B2
(45) Date of Patent: Sep. 21, 2021

(54) PERCEPTION COLLISION AVOIDANCE

(71) Applicant: Zoox, Inc., Foster City, CA (US)

(72) Inventors: Andrew Lewis King, Los Altos, CA (US); Ralph Michael Kling, Sunnyvale, CA (US); Yu Liu, Newark, CA (US); Andreas Christian Reschka, Foster City, CA (US); Robert Edward Somers, Sunnyvale, CA (US); Chuang Wang, Sunnyvale, CA (US)

(73) Assignee: Zoox, Inc., Foster City, CA (US)

( * ) Notice: Subject to any disclaimer, the term of this patent is extended or adjusted under 35 U.S.C. 154(b) by 430 days.

(21) Appl. No.: 16/189,726

(22) Filed: Nov. 13, 2018

(65) Prior Publication Data

US 2020/0148201 A1 May 14, 2020

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0953* (2013.01); *B60W 30/0956* (2013.01);
(Continued)

(58) Field of Classification Search
CPC ............. B60W 30/09; B60W 30/0953; B60W 30/0956; B60W 50/023; B60W 2554/802;
(Continued)

(56) References Cited

U.S. PATENT DOCUMENTS 6,226,389 B1 5/2001 Lemelson et al.
6,393,362 B1 5/2002 Burns
(Continued)

FOREIGN PATENT DOCUMENTS

RU     2012126039 A   12/2013
WO   WO2017079349 A1   5/2017
WO   WO2018156451 A1   8/2018

OTHER PUBLICATIONS

Berntorp, "Path Planning and Integrated Collision Avoidance for Autonomous Vehicles," 2017 American Control Conference, Seattle, WA, May 24-26, 2017, pp. 4023-4029.
(Continued)

*Primary Examiner* — Thomas Ingram
(74) *Attorney, Agent, or Firm* — Lee & Hayes, P.C.

(57) ABSTRACT

A secondary system operates on a vehicle to avoid a collision when a problem occurs with a primary system. For example, the secondary system may operate independently from the primary system to take over control of the vehicle from the primary system when the secondary system detects a potential collision, when an error occurs with the primary system, and so on. In examples, the primary system may implement first techniques, such as Artificial Intelligence (AI) techniques, to understand an environment around the vehicle and/or instruct the vehicle to move within the environment. In examples, the secondary system may implement second techniques that are based on positioning, velocity, acceleration, etc. of the vehicle and/or objects around the vehicle.

21 Claims, 5 Drawing Sheets

(51) Int. Cl.
*B60W 50/023* (2012.01)
*G05D 1/00* (2006.01)
*G05D 1/02* (2020.01)
*G08G 1/16* (2006.01)
*G06N 20/00* (2019.01)

(52) U.S. Cl.
CPC ......... *B60W 50/023* (2013.01); *G05D 1/0088* (2013.01); *G05D 1/0221* (2013.01); *G06N 20/00* (2019.01); *G08G 1/166* (2013.01); *G05D 2201/0213* (2013.01)

(58) Field of Classification Search
CPC ......... B60W 60/0027; B60W 2420/52; B60W 2050/0052; B60W 60/0017; B60W 60/00186; B60W 50/0205; B60W 50/035; G06N 20/00; G06N 3/0445; G06N 20/10; G06N 5/025; G06N 3/0454; G06N 3/088; G06N 3/084; G06N 3/0472; G06N 7/005; G06N 20/20; G05D 1/0088; G05D 1/0221; G05D 2201/0213
See application file for complete search history.

(56) References Cited

U.S. PATENT DOCUMENTS

| | | | |
|---|---|---|---|
| 9,630,619 | B1 | 4/2017 | Kentley et al. |
| 9,731,729 | B2* | 8/2017 | Solyom ................. B60W 10/18 |
| 10,235,882 | B1* | 3/2019 | Aoude ............. G08G 1/096716 |
| 10,324,463 | B1* | 6/2019 | Konrardy ........... G01C 21/3407 |
| 2007/0080825 | A1 | 4/2007 | Shiller |
| 2008/0312832 | A1 | 12/2008 | Greene et al. |
| 2009/0299593 | A1* | 12/2009 | Borchers ............. B60W 10/184 701/70 |
| 2010/0292871 | A1 | 11/2010 | Schultz et al. |
| 2014/0074388 | A1 | 3/2014 | Bretzigheimer et al. |
| 2016/0163198 | A1 | 6/2016 | Dougherty |
| 2016/0339910 | A1 | 11/2016 | Jonasson et al. |
| 2018/0261093 | A1* | 9/2018 | Xu ................... G08G 1/096775 |
| 2018/0348767 | A1 | 12/2018 | Jafari Tafti et al. |
| 2018/0373252 | A1* | 12/2018 | Steiner ................. G05D 1/0055 |
| 2019/0079529 | A1* | 3/2019 | Kamata .................... G06T 7/251 |
| 2019/0086916 | A1 | 3/2019 | Choi |
| 2019/0111921 | A1 | 4/2019 | Hehn et al. |
| 2019/0250617 | A1 | 8/2019 | Ford et al. |
| 2019/0250622 | A1* | 8/2019 | Nister ............... B60W 60/0015 |
| 2019/0263423 | A1 | 8/2019 | Wakabayashi et al. |
| 2020/0117206 | A1 | 4/2020 | Egnor et al. |
| 2020/0160535 | A1* | 5/2020 | Ali Akbarian ......... G06N 7/005 |
| 2020/0189573 | A1 | 6/2020 | King et al. |
| 2020/0211394 | A1 | 7/2020 | King et al. |

OTHER PUBLICATIONS

Non Final Office Action dated Aug. 28, 2020 for U.S. Appl. No. 16/218,182, "Collision Avoidance System With Trajectory Validation," King, 8 pages.

The PCT Search Report and Written Opinion dated Mar. 12, 2020 for PCT Application No. PCT/US2019/060085, 9 pages.

U.S. Appl. No. 15/622,905, filed Jun. 14, 2017, Douillard, et al., "Voxel Based Ground Plane Estimation and Object Segmentation", 74 pages.

U.S. Appl. No. 15/820,245, filed Nov. 21, 2017, Pfeiffer, et al., "Sensor Data Segmentation", 70 pages.

U.S. Appl. No. 15/833,715, filed Dec. 6, 2017, Kobilarov, et al., "Trajectory Prediction of Third-Party Objects Using Temporal Logic and Tree Search", 92 pages.

U.S. Appl. No. 16/218,182, filed Dec. 12, 2018, King, et al., "Collision Avoidance System Trajectory With Validation ", 69 pages.

Non Final Office Action dated Nov. 30, 2020 for U.S. Appl. No. 16/232,863, "Collision Avoidance System," King, 28 pages.

The PCT Search Report and Written Opinion dated Apr. 20, 2020 for PCT Application No. PCT/US2019/067276, 11 pages.

The PCT Search Report and Written Opinion dated Apr. 3, 2020 for PCT Application No. PCT/US2019/065165, 27 pages.

Office Action for U.S. Appl. No. 16/232,863, dated Mar. 17, 2021, King, "Collision Avoidance System" 28 pages.

* cited by examiner

PERCEPTION COLLISION AVOIDANCE

BACKGROUND

Safety of passengers in a vehicle and others in proximity to the vehicle is of the upmost importance. Such safety is often predicated on an accurate detection of a potential collision and timely deployment of a safety measure. While autonomous vehicles are implemented with systems that have highly effective collision detection systems, these systems may be inoperable or ineffective on rare occasions. For instance, power to a component of a system on a vehicle may be disrupted, causing the component or system to shut down momentarily or for a longer period of time. In another instance, an error may be introduced into any number of points along a relatively long processing pipeline for the system. Due to these problems, the system may not operate as effectively as desired, which may result in unsafe behavior.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
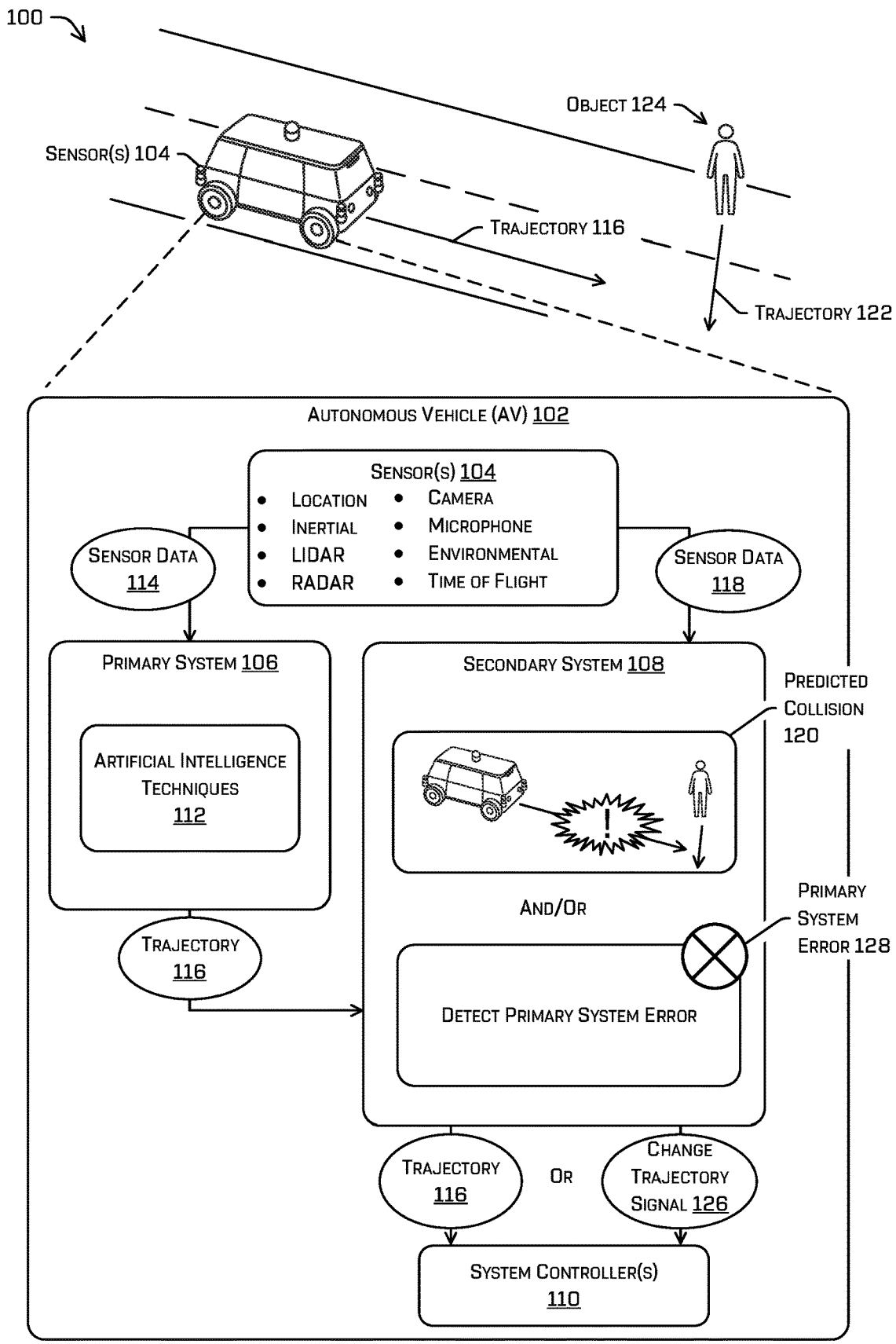
FIG. 1 illustrates an example environment in which the techniques discussed herein may be implemented.

This disclosure is directed to a vehicle including a primary system for controlling the vehicle and a secondary system that operates on the vehicle to validate operation of the primary system and to control the vehicle to avoid collisions. For example, the secondary system may operate independently from the primary system to take over control of the vehicle from the primary system when the secondary system detects a potential collision (e.g., a collision that was missed by the primary system), when an error occurs with the primary system (e.g., power failure, hardware or software failure, etc.), and so on. In examples, the secondary system may be a higher integrity (e.g., more verifiable) and/or less complex system than the primary system. In examples, the secondary system may take over control from the primary system when there is a relatively high degree of certainty (e.g., above a threshold) that an event will occur, such as a collision. The secondary system may operate independently of the primary system to enhance the safety of passengers in the vehicle and/or others in proximity to the vehicle. For example, upon a failure of the primary system or upon determining a collision is imminent, the secondary system may control the vehicle to decelerate along a trajectory or perform another maneuver. In at least some examples, the secondary system may exchange information with the primary system (e.g., by sending information about potential collisions to the primary system).

In some examples, the secondary system can operate in at least two modes where a first mode of the secondary system validates trajectories generated by the primary system and intervenes (e.g., assumes control of the vehicle) when the secondary system determines that a collision is imminent. The secondary system enters a second mode upon determining a failure of the primary system (e.g., a hardware failure) and operates to control the vehicle to decelerate along a trajectory to safely bring the vehicle to a stop.

The primary system may generally perform processing to control how the vehicle maneuvers within an environment. The primary system may implement various Artificial Intelligence (AI) techniques, such as machine learning, to understand an environment around the vehicle and/or instruct the vehicle to move within the environment. For example, the primary system may implement the AI techniques to localize the vehicle, detect an object around the vehicle, segment sensor data, determine a classification of the object, predict an object track, generate a trajectory for the vehicle, and so on. In examples, the primary system processes data from multiple types of sensors on the vehicle, such as Light Detection and Ranging (LIDAR) sensors, RADAR sensors, image sensors, depth sensors (time of flight, structured light, etc.), and the like.

The secondary system may validate on operation of the primary system and may take over control of the vehicle from the primary system when there is a problem with the primary system. The secondary system may implement probabilistic techniques that are based on positioning, velocity, acceleration, etc. of the vehicle and/or objects around the vehicle. For example, the secondary system may implement one or more probabilistic techniques to independently localize the vehicle (e.g., to a local environment), detect an object around the vehicle, segment sensor data, identify a classification of the object, predict an object track, generate a trajectory for the vehicle, and so on. In examples, the secondary system processes data from a few sensors, such as a subset of sensor data that is processed by the primary system. To illustrate, the primary system may process LIDAR data, RADAR data, image data, depth data, etc., while the secondary system may process just LIDAR data and/or RADAR data (and/or time of flight data). In other examples, however, the secondary system may process sensor data from any number of sensors, such as data from each of the sensors, data from the same number of sensors as the primary system, etc.

In examples, the secondary system may take over control of the vehicle when the secondary system detects a potential collision that was missed by the primary system. To illustrate, the secondary system may receive a trajectory for the vehicle from the primary system. The secondary system may analyze sensor data to identify a current position of an object around the vehicle and predict a future position of the object. The secondary system may then determine if the trajectory of the vehicle is likely to intersect the current or predicted position of the object. If so, this may indicate that the primary system missed detecting a potential collision with the object. Here, the secondary system may cause the vehicle to decelerate, stop, or perform another maneuver (e.g., change lanes, swerve, etc.) to avoid a collision with the object. For example, the secondary system may instruct the vehicle to come to a hard stop (e.g., a hard stop maneuver that includes braking as quickly as possible). In examples, the secondary system may cause the vehicle to decelerate or stop when it is detected that the collision is imminent (e.g., will occur within a relatively small amount of time) and/or when the collision is detected with a relatively high degree of confidence (e.g., above a threshold).

Additionally, or alternatively, the secondary system may take over control of the vehicle when an error occurs with the primary system. To illustrate, the secondary system may determine that the primary system is offline (e.g., the primary system has experienced as hardware or software failure, power to the first system was disrupted, etc.), determine that the trajectory provided by the primary system does not satisfy one or more criteria (e.g., the trajectory is different than a previous trajectory, the trajectory is not compatible with a pose of the vehicle, the trajectory is not compatible with a capability of the vehicle, the trajectory controls the vehicle to maneuver over a surface categorized as non-drivable, etc.), and so on. In response to such determination, the secondary system may cause the vehicle to decelerate, stop, or perform another maneuver. For example, the secondary system may instruct the vehicle come to a gentle stop (e.g., gentle stop maneuver that includes braking at a particular rate). This may avoid a collision with any objects, since the primary system is not operating normally. In examples, the secondary system may continue to monitor for a potential collision while the vehicle is coming to a gentle stop, so that if a potential collision is detected, the secondary system may instruct the vehicle to perform a hard stop to avoid the collision.

As noted above, the techniques and/or system discussed herein may enhance safety of passengers in a vehicle and/or other individuals in proximity to the vehicle. For example, by using a secondary system, a vehicle may safely decelerate and/or stop to avoid a collision when a problem occurs with a primary system. In examples, the secondary system may operate relatively independent from the primary system, so that another form of evaluation occurs to avoid a collision. For instance, the secondary system may independently detect an object in proximity to the vehicle based on an analysis of sensor data, evaluate a trajectory of the primary system, and so on. Further, in examples, by having the secondary system focus on specific tasks, such as detecting a problem with the primary system, the secondary system may be designed as a relatively high integrity system and/or with less processing complexity. For instance, the secondary system may be designed to process less data, include a shorter processing pipeline than the primary system, operate according to techniques that are more easily verifiable than the techniques of the primary system, and so on.

The methods, apparatuses, and systems described herein may be implemented in a number of ways. Example implementations are provided below with reference to the following figures. Although discussed in the context of an autonomous vehicle, in some examples, the methods, apparatuses, and systems described herein may be applied to a variety of systems. In another example, the methods, apparatuses, and systems may be utilized in an aviation or nautical context. Additionally, or alternatively, the techniques described herein may be used with real data (e.g., captured using sensor(s)), simulated data (e.g., generated by a simulator), or any combination thereof.

FIG. 1 illustrates an example environment 100 in which the techniques discussed herein may be implemented. The example environment 100 shows an autonomous vehicle 102 that includes a sensor(s) 104, a primary system 106, a secondary system 108, and a system controller(s) 110. The primary system 106 and/or the secondary system 108 may process sensor data from the sensor(s) 104. The primary system 106 may generally implement artificial intelligence, i.e. AI techniques 112, to control the autonomous vehicle 102. The secondary system 108 may take over control of the autonomous vehicle 102 when there is a problem with the primary system 106. The secondary system 108 may generally implement different techniques than the primary system 106. In examples, the secondary system 108 may implement techniques that are based on positioning, velocity, acceleration, etc. of the autonomous vehicle 102 and/or objects around the vehicle (e.g., Bayesian filtering, such as Kalman filters, Extended Kalman filters, and the like). The secondary system 108 may send a signal to the system controller(s) 110 to control the autonomous vehicle 102, as discussed in further detail below. Although FIG. 1 illustrates the secondary system 108 sending a signal to the system controller(s) 110, the primary system 106 may additionally, or alternatively, send a signal to the system controller(s) 110 to control the autonomous vehicle 102.

The sensor(s) 104 may include a variety of sensors, such as light detection and ranging (LIDAR) sensors, RADAR sensors, ultrasonic transducers, sonar sensors, location sensors (e.g., global navigation satellite system (GNSS) (including global positioning systems (GPS)), compass, etc.), inertial sensors (e.g., inertial measurement units (IMUs), accelerometers, magnetometers, gyroscopes, etc.), cameras (e.g., red-green-blue (RGB), infrared (IR), intensity, depth, etc.), time of flight, microphones, wheel encoders, environment sensors (e.g., temperature sensors, humidity sensors, light sensors, pressure sensors, etc.), etc.

The primary system 106 may control the vehicle during normal operation. In many examples, the primary system 106 may be the main computing system on the autonomous vehicle 102. The primary system 106 may implement the AI techniques 112 to understand an environment around the autonomous vehicle 102 and/or instruct the autonomous vehicle 102 to move within the environment. The AI techniques 112 may include machine learning (also referred to, generally, as machine learned models), such as one or more neural networks. The primary system 106 may use the AI techniques 112 to process sensor data 114 received from the sensor(s) 104. The sensor data 114 may include a wide variety of data, such as location data, inertial data, LIDAR data, RADAR data, image data, audio data, environmental data, depth data, etc. For example, the primary system 106 may analyze the sensor data 114 to localize the autonomous vehicle 102, detect an object around the autonomous vehicle 102, segment the sensor data 114, determine a classification of the object, predict an object track, generate a trajectory 116 for the autonomous vehicle 102, and so on. In examples, the trajectory 116 comprises a control(s) for a steering angle and/or acceleration of the autonomous vehicle 102. For example, the trajectory 116 may control a path that the autonomous vehicle 102 will take over a window of time (e.g., one micro-second, half a second, two seconds, ten seconds, etc.). The trajectory 116 may be continuously updated over time to control motion of the autonomous vehicle 102. As illustrated, the primary system 106 may send the trajectory 116 to the secondary system 108.

The secondary system 108 may take over control of the autonomous vehicle 102 when there is a problem with the primary system 106. The secondary system 108 may implement secondary techniques (e.g., probabilistic techniques, techniques that are different than the AI techniques 112, etc.) that are based on positioning, velocity, acceleration, etc. of the autonomous vehicle 102 and/or objects around the autonomous vehicle 102. For example, the secondary system 108 may implement a Kalman filter, an extended Kalman filter (EKG), a particle filter, and/or tracking algorithms to process sensor data, segment sensor data, identify a classification of an object, predict an object trajectory, and so on. In examples, the secondary system 108 may not perform any form of AI techniques. In some examples, the AI techniques 112 may use neural networks, while the secondary system 108 may refrain from using such neural networks. In other examples, the secondary system 108 may perform AI techniques, such as implementing a machine learned model that is different (or the same in some instances) than a machine learned model implemented by the primary system 106.

In examples, the secondary system 108 processes sensor data 118 from the sensor(s) 104 and/or the trajectory 116 from the primary system 106. In some examples, the sensor data 118 includes a subset of the sensor data 114 that is processed by the primary system 106. To illustrate, the sensor data 118 may include a particular type of data (e.g., LIDAR, RADAR, time of flight, etc.). In other examples, the sensor data 118 includes the same or more data than the sensor data 114, such as one or more of location data, inertial data, LIDAR data, RADAR data, image data, audio data, environmental data, and/or depth data.

In some examples, the secondary system 108 takes over control of the autonomous vehicle 102 when the secondary system 108 detects a predicted collision 120 that was missed by the primary system 106. In examples, the secondary system 108 may process the sensor data 118 to detect objects around the autonomous vehicle 102 and/or track the objects over time. Further, in examples, the secondary system 108 may receive information from the primary system 106 indicating tracks of objects that are detected by the primary system 106 and/or predicted trajectories of the objects. A track of an object may include a path traveled by the object. A track of an object may represent (or be based on) a current or previous position, velocity, acceleration, orientation, and/or heading of the object over a period of time (e.g., 5 seconds). The secondary system 108 may maintain a track for each object detected around the autonomous vehicle 102.

The secondary system 108 may analyze the trajectory 116 of the autonomous vehicle 102, a track of an object, and/or a trajectory of the object to determine if the trajectory 116 of the autonomous vehicle 102 and the trajectory of the object intersect. In examples, the secondary system 108 may use a straight-line approximation to predict a trajectory of an object. If an intersection is detected, the secondary system 108 may detect the predicted collision 120 that was missed by the primary system 106. In other words, the secondary system 108 may determine that the autonomous vehicle 102 would collide with an object if the autonomous vehicle 102 continues along the trajectory 116 (e.g., continues following the trajectory 116). In the example of FIG. 1, the secondary system 108 may determine that a trajectory 122 of an object 124 intersects with the trajectory 116 of the autonomous vehicle 102 (e.g., the autonomous vehicle 102 would collide with the object 124 if the autonomous vehicle 102 continues along the trajectory 116). Here, the object 124 represents a person, although the object 124 may represent any type of object, such as another vehicle, a structure (e.g., building, etc.), an animal, a sign, and so on.

If the secondary system 108 detects the predicted collision 120, the secondary system 108 may send a change trajectory signal 126 to cause the autonomous vehicle 102 to decelerate, stop, or perform another maneuver (e.g., change lanes, change direction abruptly, pull to the side of the road, etc.). For example, the secondary system 108 may send the change trajectory signal 126 to the system controller(s) 110 to perform a hard stop maneuver. A hard stop maneuver may include braking at a particular rate, such as a predetermined rate, a rate that is greater than a threshold (e.g., a maximum braking rate), a rate from among a plurality of available rates that is a greatest rate, and so on. In one example, a hard stop maneuver may include decelerating at a rate of 15 or 20 feet per second until the autonomous vehicle 102 comes to a stop. In examples, the change trajectory signal 126 may instruct the system controller(s) 110 to control the autonomous vehicle 102 to decelerate along the trajectory 116.

Further, in some examples, the secondary system 108 takes over control of the autonomous vehicle 102 when there is a primary system error 128. In one example, the secondary system 108 may detect the primary system error 128 when the primary system 106 is offline (e.g., the primary system 106 has experienced a hardware or software failure, power to the primary system 106 was disrupted, etc.). This may be based on a signal from the primary system 106, a component of the primary system 106, and/or a service provider (e.g., remote device) indicating a hardware or software failure. Additionally, or alternatively, this may be based on a signal from a battery of the autonomous vehicle 102 or other component associated with providing power indicating whether or not power is being provided to the primary system 106 (or a component of the primary system 106). In another example, the secondary system 108 may determine the primary system error 128 when the trajectory 116 does not satisfy one or more criteria, such as the trajectory 116 being different than a previous trajectory by a particular amount, the trajectory 116 not being compatible with a pose of the autonomous vehicle 102, the trajectory 116 not being compatible with a capability of autonomous vehicle 102, the trajectory 116 controlling the autonomous vehicle 102 to maneuver over a surface categorized as non-drivable, and so on. Examples of such processing is discussed in further detail below.

If the secondary system 108 detects the primary system error 128, the secondary system 108 may send the change trajectory signal 126 to cause the autonomous vehicle 102 to decelerate, stop, or perform another maneuver. For example, the secondary system 108 may send the change trajectory signal 126 to the system controller(s) 110 to perform a gentle stop maneuver. A gentle stop maneuver may include braking at a particular rate, such as a predetermined rate, a rate that is less than a first rate (e.g., maximum braking rate) and greater than a second rate (e.g., minimum braking rate), a rate from among a plurality of available rates that is substantially in the middle (e.g., a third rate from among five rates), and so on. A rate of deceleration may refer to a unit of measurement over time, such as a number of meters or feet per second. In one example, a gentle stop maneuver may include decelerating at a rate of 5 or 10 feet per second until the autonomous vehicle 102 comes to a stop. In examples, the change trajectory signal 126 may be related to the trajectory 116. For instance, the change trajectory signal 126 may instruct the system controller(s) 110 to decelerate along the trajectory 116 (e.g., slow down along the same course). That is, the secondary system 108 may use steering controls associated with the trajectory 116 while modifying acceleration parameters associated with the trajectory 116 to cause the autonomous vehicle 102 to a stop.

In some examples, the secondary system 108 may wait to send the change trajectory signal 126 until a last possible time. To illustrate, at 11:30:40 AM, the secondary system 108 may determine that the autonomous vehicle 102 would collide with an object in five seconds (at 11:30:45 AM) if the trajectory 116 is maintained. The secondary system 108 may also determine that an amount of time needed to stop the autonomous vehicle 102 (e.g., with a hard stop maneuver)

and avoid a collision with the object is three seconds (e.g., based on a velocity of the vehicle and/or the object). The secondary system 108 may use such information to determine a last possible time when the autonomous vehicle 102 needs to initiate a hard stop maneuver to avoid a collision (also referred to as a time to last second braking (TTLSB)). In this example, the time to last second braking is 11:30:42 AM. Here, the secondary system 108 may wait two seconds, and determine, at 11:30:42 AM, if the primary system 106 adjusted the trajectory 116 of the autonomous vehicle 102 or if the autonomous vehicle 102 is still on course to collide with the object. If the autonomous vehicle 102 is still on course to collide with the object, the secondary system 108 may send the change trajectory signal 126 to perform a hard stop maneuver.

In some examples, the secondary system 108 may provide a warning signal to the primary system 106 that it will intervene if no action is taken. This may allow the primary system 106 to readjust a trajectory. For example, the secondary system 108 may send a warning signal to the primary system 106 indicating that a potential collision will occur in four seconds, and that the secondary system 108 will intervene in two seconds if a trajectory is not adjusted. In at least some examples, such a warning signal may also comprise sending such detected objects, predicted object trajectories, and predicted collisions as determined by the secondary system 108.

If the secondary system 108 does not detect the predicted collision 120 and/or the primary system error 128, the secondary system 108 may send the trajectory 116 to the system controller(s) 110. In other words, the secondary system 108 may cause the autonomous vehicle 102 to proceed along the trajectory 116 that is generated by the primary system 106.

In some examples, the primary system 106 may generate multiple trajectories, such as a main trajectory and one or more contingent trajectories. In examples, the secondary system 108 may adjust the main trajectory and/or a contingent trajectory when the predicted collision 120 and/or the primary system error 128 are detected. Example techniques are discussed in further detail below.

Although the example of FIG. 1 discussing using a hard stop maneuver when the predicted collision 120 is detected and using a gentle stop maneuver when the primary system error 128 is detected, such maneuvers may be used in any type of situation. For example, a gentle stop maneuver may be used when the predicted collision 120 is detected (as long as this avoids a collision) and/or a hard stop maneuver may be used when the primary system error 128 is detected. Further, other types of maneuvers may be used, such as a maneuver that causes the autonomous vehicle 102 to decelerate at any rate, pull over to the side of the road, swerve or make another direction change, etc. In examples, the secondary system 108 may generate a new trajectory that causes the autonomous vehicle 102 to perform a maneuver.

In some instances, the autonomous vehicle 102 may operate according to different parameters to detect the predicted collision 120 and the primary system error 128. In examples, the secondary system 108 may operate according to a first set of parameters to detect the predicted collision 120 with a relatively high degree of accuracy. To illustrate, the secondary system 108 may detect the predicted collision 120 when an analysis of both LIDAR and RADAR data indicate a collision, when an object track has existed for more than a period of time, when a covariance of a detection is below a threshold, etc. Further, in examples, the secondary system 108 may operate according to a second set of parameters to detect the primary system error 128 with a lower degree of accuracy. By doing so, the secondary system 108 may initiate a hard stop maneuver when a collision is detected with a relatively high degree of confidence, and may initiate a gentle stop maneuver when an error with the primary system 106 is detected with a lower degree of confidence.

Figure 2:
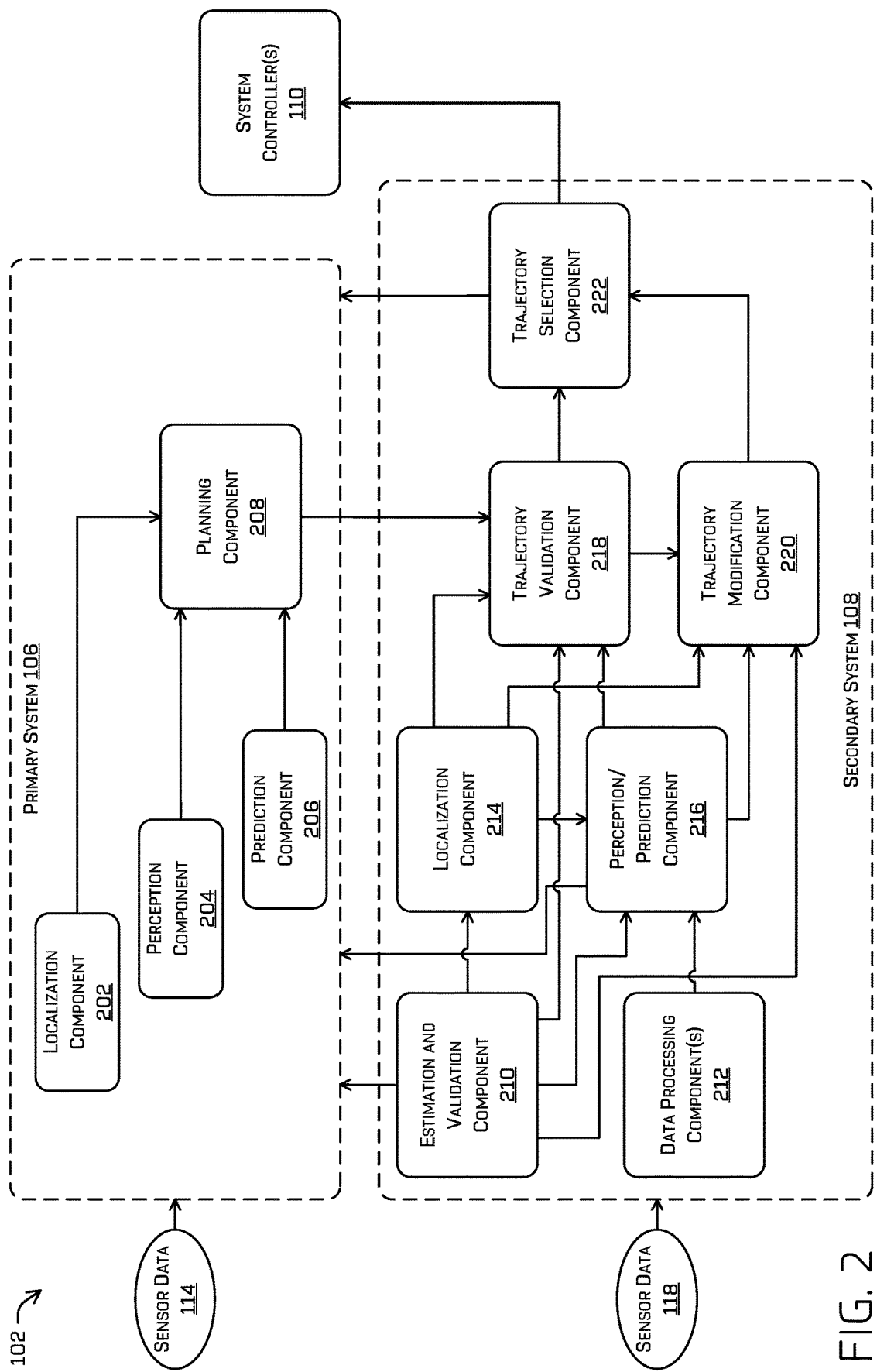
FIG. 2 depicts example details of a primary system and a secondary system of a vehicle.

FIG. 2 depicts example details of the primary system 106 and the secondary system 108 of the autonomous vehicle 102 of FIG. 1.

In this example, the primary system 106 includes a localization component 202, a perception component 204, a prediction component 206, and a planning component 208. The localization component 202, the perception component 204, the prediction component 206, and/or the planning component 208 may collectively and/or individually include a processing pipeline that implements one or more machine learned models, such as neural networks, that accomplish a variety of functions. Each processing pipeline may receive data and provide an output. In one example, the perception component 204 implements one or more neural networks in a processing pipeline to perform object detection, segmentation, and/or classification. Each stage in the pipeline may provide some aspect of perception (e.g., object detection, classification, bounding box generation, and the like) that may feed into another stage of the pipeline. In examples, the primary system 106 implements multiple neural networks that are trained using thousands or hundreds of thousands of hours of vehicle training data. Further, the multiple neural networks may be configured to perceive a myriad of complex scenarios and control the autonomous vehicle 102 in view of those scenarios. In examples, the primary system 106 uses parallel computing (e.g., in a GPU), while the secondary system 108 does not. In other examples, parallel computing is used in the primary system 106 and/or the secondary system 108.

As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet60, ResNet101, VGG, DenseNet, PointNet, and the like.

The localization component 202 may include functionality to receive the sensor data 114 from the sensor(s) 104 (not illustrated in FIG. 2) to determine a pose (e.g., position and/or orientation) of the autonomous vehicle 102 and/or a map of an environment surrounding the autonomous vehicle 102. For example, the localization component 202 may determine and/or receive a map of an environment and may continuously determine a location of the autonomous vehicle 102 within the map. The map may comprise a topological map, an occupancy grid, a point map, a landmark map, a mesh, a graph of pose constraints, and/or any other suitable map. In some instances, the localization component 202 may utilize SLAM (simultaneous localization and mapping) or CLAMS (calibration, localization and mapping, simultaneously) to receive image data, LIDAR data, RADAR data, IMU data, GPS data, wheel encoder data, and/or the like to accurately determine a location/pose of the autonomous vehicle 102. The location of the autonomous vehicle 102 may comprise a pose that includes a relative position and/or orientation of the autonomous vehicle 102 in relation to point(s) and/or object(s) in the map, a local coordinate, and/or a global coordinate (e.g., a GPS coordinate). In additional or alternate instances, the orientation may include an indication of a yaw, roll, and/or pitch of the autonomous vehicle 102 relative to a reference plane and/or relative to point(s) and/or object(s) in the map. Together the position and/or orientation may describe a "pose."

In some instances, the localization component 202 may provide data to various components of the autonomous vehicle 102. For example, the localization component 202 may provide a pose of the autonomous vehicle 102 to the planning component 208 to generate a trajectory, as discussed below. In other examples, the localization component may provide a pose of the autonomous vehicle 102 to other components of the autonomous vehicle 102, such as the perception component 204 and/or the prediction component 206.

The perception component 204 may include functionality to perform object detection, segmentation, and/or classification. In some examples, the perception component 204 may receive as input the sensor data 114 and output primary perception data that indicates a presence of an object that is proximate to the autonomous vehicle 102 and/or a classification of the object as an object type (e.g., a semantic label such as, for example, car, pedestrian, cyclist, building, tree, road surface, curb, sidewalk, unknown, etc.). Additionally, or alternatively, the perception component 204 may provide processed sensor data that indicates one or more characteristics associated with a detected object and/or the environment in which the object is positioned. In some examples, characteristics associated with an object may include, but are not limited to, an x-position (e.g., global position, relative position, etc.), a y-position (e.g., global position, relative position, etc.), a z-position (e.g., global position, relative position, etc.), an orientation, an object type (e.g., a classification), a velocity of the object, an extent of the object (size), etc. In some examples, a velocity of an object may be determined from RADAR processing and/or other techniques. Characteristics associated with the environment may include, but are not limited to, a presence of another object in the environment, a state of another object in the environment, a time of day, a day of a week, a season, a weather condition, an indication of darkness/light, etc.

In some instances, the perception component 204 may provide primary perception data and/or processed sensor data to various components of the autonomous vehicle 102. For example, the perception component 204 may provide primary perception data and/or processed sensor data to the planning component 208. In other examples, the perception component 204 may provide primary perception data and/or processed sensor data to other components of the autonomous vehicle 102, such as the localization component 202 and/or the prediction component 206. In examples, primary perception data and/or processed sensor data may be in the form of a primary object list including a list of objects and/or characteristics for each of the objects.

The prediction component 206 may associate a track with a detected object and/or predict an object trajectory. A track of an object may comprise historical object position, velocity, acceleration, and/or orientation. In some instances, the prediction component 206 may determine whether or not to associate a historical object track with an object recently detected by the perception component 204. For example, the prediction component 206 may determine whether a recently detected object is within a threshold distance of a previous position of the object associated with the historical track, a threshold velocity of a previous velocity of the object associated with the historical track, etc. In some examples, the prediction component 206 may include machine learned models to predict a behavior of an object in the environment based on lighting state (e.g., blinker detection), object velocity/acceleration, map data (e.g., lane information indicating reasonable driving behaviors), and/or learned object behaviors. In some examples, the prediction component 206 may predict one or more predicted object trajectories for a specific object detected by the perception component 204 based on, for example, probabilistic determinations or multimodal distributions of a historical, current, and/or or predicted position, velocity, acceleration, and/or orientation of an object.

In some instances, the prediction component 206 may provide data regarding an object track, predicted object trajectories (e.g., one or more trajectories and associated uncertainties), and/or other data to various components of the autonomous vehicle 102. For example, the prediction component 206 may provide such data to the planning component 208. In some examples, the prediction component 206 may generate a heat map associated with predicted motion of an object and may provide such a heat map to the planning component 208. In other examples, the prediction component 206 may provide data regarding an object to other components of the autonomous vehicle 102, such as the localization component 202 and/or the perception component 204. Further, in some examples, data regarding an object may be provided to the secondary system 108. In examples, data regarding an object may be stored in a primary object list.

In some examples, the perception component 204 and/or the prediction component 206 may implement techniques discussed in U.S. patent application Ser. No. 15/622,905 entitled "Voxel Based Ground Plane Estimation and Object Segmentation" and filed Jun. 14, 2017, U.S. patent application Ser. No. 15/833,715 entitled "Trajectory Prediction of Third-Party Objects Using Temporal Logic and Tree Search" and filed Dec. 6, 2017, and/or U.S. patent application Ser. No. 15/820,245, entitled "Sensor Data Segmentation" and filed Nov. 21, 2017, the entire content of all of which are incorporated herein by reference.

The planning component 208 may determine a path and/or trajectory for the autonomous vehicle 102 to follow to traverse through an environment. For example, the planning component 208 may determine various routes and/or trajectories and various levels of detail. For example, the planning component 208 may determine a route to travel from a first location (e.g., a current location) to a second location (e.g., a target location). For the purpose of this discussion, a route may be a sequence of waypoints for travelling between two locations. As non-limiting examples, waypoints include streets, intersections, global positioning system (GPS) coordinates, etc. Further, the planning component 208 may generate an instruction for guiding the autonomous vehicle 102 along at least a portion of the route from the first location to the second location. In at least one example, the planning component 208 may determine how to guide the autonomous vehicle 102 from a first waypoint in the sequence of waypoints to a second waypoint in the sequence of waypoints. In some examples, the instruction may comprise a trajectory, or a portion of a trajectory.

In some examples, the planning component 208 may substantially simultaneously (e.g., within technical tolerances) generate multiple trajectories in accordance with a receding horizon technique and/or based at least in part on the data received from the other components of the primary system 106. In some instances, the planning component 208 may conduct a cost-based search (or any other suitable algorithm for identifying a suitable trajectory for controlling motion of the autonomous vehicle 102) over the multiple trajectories to identify a single trajectory to transmit to the secondary system 108. In some instances, the planning component 208 may additionally generate multiple contingent trajectories and select one of the contingent trajectories to transmit to the secondary system 108. In some instances, the contingent trajectory may differ from the (main) trajectory. For example, a trajectory would cause the autonomous vehicle 102 to make a lane change whereas a contingent trajectory would cause the autonomous vehicle 102 to stay in a same lane. In another example, a trajectory would cause the autonomous vehicle 102 to maintain a current speed and steering angle whereas a contingent trajectory would cause the autonomous vehicle 102 to pull over onto a roadway shoulder.

Although the localization component 202, the perception component 204, and the prediction component 206 are generally discussed in the context of providing outputs to each other (or other components of the primary system 106), any of these components may provide output to the secondary system 108, in some examples.

As illustrated, the secondary system 108 includes an estimation and validation component 210, a data processing component(s) 212, a localization component 214, a perception/prediction component 216, a trajectory validation component 218, a trajectory modification component 220, and a trajectory selection component 222. In examples, the estimation and validation component 210, the data processing component(s) 212, the localization component 214, the perception/prediction component 216, the trajectory validation component 218, the trajectory modification component 220, and/or the trajectory selection component 222 may implement a model that is based on physics and/or statistics. In some examples, such models may incorporate probabilistic models. For example, the secondary system 108 may implement a Kalman filter (also referred to as linear quadratic estimation (LQE)) (e.g., an extended Kalman filter (EKF), an unscented Kalman filter (UKF), etc.), a particle filter, and so on. To illustrate, the perception/prediction component 216 may implement a Kalman filter or particle filter. In some examples, the secondary system 108, in contrast to the primary system 106, may be configured in such a way to exclude the use of machine learned models or to reduce the number of machine learned models. In other examples, the secondary system 108 may include one or more machine learned models different than (or similar or identical) those of the primary system 106. In some examples, the secondary system 108 may use different hardware (e.g., processors and memory) than the primary system 106.

In examples, the secondary system 108 may be designed to be less computationally burdensome and/or operate at a higher integrity level. For example, a processing pipeline of the secondary system 108 may be simpler by relying on less sensor data, include less complex pipeline components, include less pipeline components overall, output less data, and/or exclude and/or limit the use of machine learned models. In some instances, the secondary system 108 may be a "high-integrity" system by achieving stringent operating tolerances and/or have the ability to be inspected (verified). In examples, the secondary system 108 may have a higher level of reliability and/or verifiability than the primary system 106. For example, output of a sub-component of the secondary system 108 may be certified to operate with complete accuracy or near-complete accuracy (e.g., 99.99% of scenarios, or higher). In some examples, the secondary system 108 or components of the secondary system 108 may be referred to as a collision avoidance system (CAS). In some examples, the secondary system 108 may comprise an Automotive Safety Integrity Level (ASIL) D certification.

The estimation and validation component 210 may determine a direction of motion of the autonomous vehicle 102, a velocity of the autonomous vehicle 102, an acceleration of the autonomous vehicle 102, a yaw rate of the autonomous vehicle 102, a yaw acceleration, and/or a steering angle of the autonomous vehicle 102. In examples, such information may be based on signals from the system controller(s) 110, a drive system(s), etc. The estimation and validation component 210 may generate data indicating one or more of such information and provide the data to various components of the secondary system 108, such as the localization component 214, the perception/prediction component 216, the trajectory validation component 218, the trajectory modification component 220, etc. In examples, the estimation and validation component 210 may provide the data to the primary system 106.

The localization component 214 may receive the sensor data 118 from the sensor(s) 104 (or the data processing component 212) to determine one or more of a position and/or orientation (together a pose) of the autonomous vehicle 102. Here, the position and/or orientation may be relative to point(s) and/or object(s) in an environment in which the autonomous vehicle 102 is located. In examples, the orientation may include an indication of a yaw, roll, and/or pitch of the autonomous vehicle 102 relative to a reference plane and/or relative to point(s) and/or object(s). In examples, the localization component 214 may perform less processing than the localization component 202 of the primary system 106 (e.g., higher-level localization). For instance, the localization component 214 may not determine a pose of the autonomous vehicle 102 relative to a map, but merely determine a pose of the autonomous vehicle 102 relative to objects and/or surfaces that are detected around the autonomous vehicle 102 (e.g., a local position and not a global position). Such a position and/or orientation may be determined, for example, using probabilistic filtering techniques, such as, for example, Bayesian filters (Kalman filters, extended Kalman filters, unscented Kalman filters, etc.) using some or all of the sensor data.

The localization component 214 may provide the position and/or orientation of the autonomous vehicle 102 to various components of the secondary system 108, such as the perception/prediction component 216, the trajectory validation component 218, and/or the trajectory modification component 220.

The data processing component(s) 212 may process the sensor data 118 received from the sensor(s) 104 (not illustrated in FIG. 2) to determine processed sensor data. For instances, the data processing component(s) 212 may analyze the sensor data 118 to remove noise in the sensor data 118. In some examples, the data processing component(s) 212 may include multiple components that each process a different type of data. For instance, a first data processing component may be implemented to process LIDAR data, while a second data processing component may be implemented to process RADAR data. The different data processing components may operate according to different algorithms. In some examples, the sensor data 118 (in a processed or non-processed state) may indicate a return for an object (e.g., that an object was detected on or above a ground surface). Such return may be determined by the sensor(s) 104. The data processing component(s) 212 may send the sensor data 118 (in a processed or non-processed state) to other components of the secondary system 108, such as the perception/prediction component 216.

In some examples, the data processing component(s) 212 may filter the sensor data 118 to generate a reduced amount of data. In one example, the data processing component(s) 212 may remove data from the sensor data 118 that is outside a particular range. This may be based on a velocity or acceleration of the autonomous vehicle 102, a track of an object, a velocity or acceleration of an object, etc. (e.g., remove a substantial amount of data when traveling relatively slow and remove less data when traveling relatively fast). To illustrate, if the autonomous vehicle 102 is traveling at 15 miles per hour, and no vehicles are traveling at the autonomous vehicle 102, the data processing component(s) 212 may remove data that is 200 feet away, since this data is likely not needed to evaluate a trajectory or identify a potential imminent collision. In another example, the data processing component(s) 212 may remove data from the sensor data 118 based on a type of environment in which the autonomous vehicle 102 is located. For example, if the autonomous vehicle 102 is in an urban area with multiple vehicles, roads, road intersections, etc., the data processing component(s) 212 may not remove data from the sensor data 118 (or remove a limited amount). However, if the autonomous vehicle 102 is in a rural area or sparse region of an urban environment with relatively few vehicles, roads, road intersections, etc., the data processing component(s) 212 may remove more data from the sensor data 118. In examples, reducing the amount of the sensor data 118 may allow the secondary system 108 to operate more quickly (e.g., process less data, resulting in reduced compute time).

Although the data processing component(s) 212 is illustrated in FIG. 2, in some examples the sensor data 118 may be passed to various components of the secondary system 108 without passing through the data processing component(s) 212. For example, the sensor data 118 may be passed to various components of the secondary system 108 in a raw format.

The perception/prediction component 216 may include functionality to perform object detection, object segmentation, object classification, track determination, and/or predicting one or more trajectories for each object (including uncertainties, for example), etc. In some examples, the perception/prediction component 216 may receive, as input data, the sensor data 118 from the data processing component(s) 212 (in a processed or non-processed format), a pose of the autonomous vehicle 102 from the localization component 214, and/or a trajectory from the primary system 106. Additionally, or alternatively, the perception/prediction component 216 may receive, as input data, data from the estimation and validation component 210 indicating a direction of motion of the autonomous vehicle 102, a velocity of the autonomous vehicle 102, an acceleration of the autonomous vehicle 102, a yaw rate of the autonomous vehicle 102, a yaw acceleration, and/or a steering angle of the autonomous vehicle 102. Further, in some examples, the perception/prediction component 216 may receive, as input data, data from the primary system 106, such as a primary object list from the perception component 204 and/or a pose of the autonomous vehicle 102. Such data may be received in some instances when the primary system 106 is online. As noted above, the object list from the primary system 106 may include primary perception data, processed sensor data, data regarding a track of an object, etc. In at least some examples, the primary system 106 may transmit track information for objects to the secondary system 108. In such an example, the perception/prediction component 216 may perform data association (e.g., by using probabilistic filters, clustering, nearest point analysis, or the like) to associate sensor data with a track provided.

The perception/prediction component 216 may process the input data to determine secondary perception data. The secondary perception data may indicate a presence of an object that is proximate to the autonomous vehicle 102, a characteristic(s) associated with the object, and so on. Here, a characteristic(s) associated with an object may include a position of the object relative to the autonomous vehicle 102, an orientation of the object relative to the autonomous vehicle 102, a velocity of the object, an acceleration of the object, an extent of the object (size of the object), a size of the object, etc. In many examples, a characteristic included in the secondary perception data does not include a classification of an object (e.g., semantic label). Although in some examples, the secondary perception data may indicate a classification.

The perception/prediction component 216 may also process the input data to determine one or more tracks for an object. As noted above, a track of an object may comprise historical position, velocity, acceleration, and/or orientation, and the like. In one example, the perception/prediction component 216 may determine an object in an environment at a first time, determine an object in an environment at a second time, determine an overlap of the objects at the first time and second time, and generate a track for the object. In another example, the perception/prediction component 216 may determine a velocity of an object at a first time, compare a predicted motion of the object with captured data of the object at a second time, determining an overlap, and generate a track for the object. The perception/prediction component 216 may determine a track for each object detected around the autonomous vehicle 102. In some examples, the perception/prediction component 216 may determine a track of an object independently from data received from the primary system 106 (e.g., will not use a primary object list and/or a pose of the autonomous vehicle 102 received from the primary system 106). While in other examples, the perception/prediction component 216 may use data received from the primary system 106.

The perception/prediction component 216 may also process the input data to determine one or more predicted trajectories for an object. For example, based on a current position of an object and a velocity of the object over a period of a few seconds, the perception/prediction component 216 may predict a path that the object will move over the next few seconds. In some examples, such a predicted path may comprise using linear assumptions of motion given a position, orientation, velocity, and/or orientation. In other examples, such predicted paths may comprise more complex analyses.

In some examples, the perception/prediction component 216 may determine diagnostics data. The diagnostics data may indicate a status of input data to the perception/prediction component 216 (e.g., indicate a timing of receiving the sensor data 118 from the sensor(s) 104, such as the sensor data 118 be older than a threshold time). Further, the diagnostics data may indicate a frequency of receiving the input data (e.g., every so many milliseconds), a latency of the input data (e.g., a delay at the sensor(s) 104 of sending a signal within an environment and receiving a signal in return), a main loop and output frequency, and/or compute usage.

The perception/prediction component 216 may output the secondary perception data, data regarding an object (e.g., a track, trajectory, etc.), and/or the diagnostics data to the trajectory validation component 218, the trajectory modification component 220, and/or any other component of the secondary system 108. In examples, the secondary perception data and/or data of an object are represented in a secondary object list. For instance, the object list may indicate, for each object, a characteristic(s) of the object and/or a track/trajectory of the object. In examples, the perception/prediction component 216 may output the secondary perception data, data regarding an object, and/or the diagnostics data to the primary system 106.

For ease of illustration the perception/prediction component 216 (and other components of the primary system 106 and the secondary system 108) is illustrated with a single block. However, the perception/prediction component 216 (and/or other components of the primary system 106 and the secondary system 108) may be implemented as any number of blocks.

The trajectory validation component 218 may validate a trajectory of the autonomous vehicle 102 received from the primary system 106. For example, the trajectory validation component 218 may determine if a trajectory is collision-free. Here, the trajectory validation component 218 may compare a trajectory of the autonomous vehicle 102 (e.g., an estimated path if the autonomous vehicle 102 maintains the trajectory) with data received from the perception/prediction component 216 (e.g., secondary perception data, data regarding a track of an object, etc.). If the comparison indicates that the trajectory of the autonomous vehicle 102 will intersect with a track or predicted trajectory of an object (or a probability of the intersection is above a threshold), the trajectory validation component 218 may determine that the trajectory is invalid.

In some examples where a trajectory of the autonomous vehicle 102 and a track or predicted trajectory of an object intersect, the trajectory validation component 218 may determine a time to last second braking (TTLSB) for the object. As noted above, the time to last second braking is a last possible time when the autonomous vehicle 102 needs to initiate a hard stop maneuver to avoid a collision with the object. If the time to last second braking is within a threshold amount of time, the trajectory validation component 218 may determine that the trajectory of the autonomous vehicle 102 is invalid. To illustrate, if the time to last second braking for an object is in ten milliseconds, the trajectory validation component 218 may determine that the trajectory of the autonomous vehicle 102 is invalid. In examples, the trajectory validation component 218 may evaluate a time to last second braking for each object in an object list.

In examples, the trajectory validation component 218 may validate a trajectory of the autonomous vehicle 102 by determining if the trajectory is different than a previous trajectory by more than a particular amount. To illustrate, the trajectory validation component 218 may determine if the trajectory has changed direction by more than a threshold amount from the last trajectory (e.g., more than a threshold amount of heading/angle change). If there is more than the threshold amount of change, the trajectory validation component 218 may determine that the trajectory is invalid. In another illustration, the trajectory validation component 218 may determine that a trajectory is invalid when an acceleration for the trajectory has changed by more than a threshold amount from a previous trajectory. In some instances, a trajectory may be compared to multiple previous trajectories, such as the last three trajectories, to determine if there is more than a threshold amount of change from each of the previous trajectories. The trajectory validation component 218 may store trajectories over time, so that one or more previous trajectories may be referenced.

In examples, the trajectory validation component 218 may validate a trajectory of the autonomous vehicle 102 by determining if the trajectory is compatible with a pose of the autonomous vehicle 102. To illustrate, the trajectory validation component 218 may analyze a pose received from the localization component 214. If the trajectory requires the autonomous vehicle 102 to change an orientation of the autonomous vehicle 102 that is incompatible with a current orientation of the autonomous vehicle 102, such as requiring the autonomous vehicle 102 to roll to an up-side-down position, the trajectory validation component 218 may determine that the trajectory is invalid.

In examples, the trajectory validation component 218 may validate a trajectory of the autonomous vehicle 102 by determining if the trajectory is compatible with a capability of the autonomous vehicle 102. The capabilities may be based on hardware and/or software components of the autonomous vehicle 102 and/or limitations of those components. To illustrate, the trajectory validation component 218 may reference capabilities of the autonomous vehicle 102, such as a maximum steering angle, an amount of time to change from one steering angle to another steering angle, and so on. If the trajectory requires a change past the maximum steering angle and/or the trajectory requires the steering to change quicker than an amount of time needed to make a steering angle adjustment, the trajectory validation component 218 may determine that the trajectory is invalid.

In examples, the trajectory validation component 218 may validate a trajectory of the autonomous vehicle 102 by determining if the trajectory controls the autonomous vehicle 102 to maneuver over a surface that is categorized as non-drivable. To illustrate, the trajectory validation component 218 may receive data from the perception/prediction component 216 (e.g., secondary perception data, etc.). Such data may indicate how smooth a surface is. If the trajectory validation component 218 determines that the surface has a smoothness characteristic that is below or above a smoothness threshold, the trajectory validation component 218 may categorize the surface as non-drivable. In alternative examples, such determination may be made by the perception/prediction component 216. In any event, if the trajectory validation component 218 determines that the trajectory is along a surface that is non-drivable, the trajectory validation component 218 may determine that the trajectory is invalid.

If the trajectory validation component 218 determines that a trajectory of the autonomous vehicle 102 is invalid, then the trajectory validation component 218 may send a signal to the trajectory modification component 220 instructing the trajectory modification component 220 to control the autonomous vehicle 102 to decelerate, stop, or perform another maneuver. In examples, the signal may indicate why the trajectory is invalid (e.g., indicate a type of invalidity). Alternatively, if the trajectory validation component 218 does not detect an issue with the trajectory during one or more of the determinations discussed above (e.g., the trajectory is not invalid), the trajectory validation component 218 may determine that the trajectory is valid. Here, the trajectory validation component 218 may send a signal to the trajectory selection component 222 indicating that the trajectory is valid and to use the trajectory to control the autonomous vehicle 102.

In some examples, the trajectory validation component 218 may evaluate a main trajectory of the autonomous vehicle 102, and evaluate a contingent trajectory of the autonomous vehicle 102 if the main trajectory is invalid. For example, upon determining that a main trajectory is invalid using any of the techniques discussed herein, the trajectory validation component 218 may determine if a contingent trajectory is valid. If the contingent trajectory is valid, the trajectory modification component 220 may send a signal to the trajectory selection component 222 to use the contingent trajectory. If the contingent trajectory is invalid, the trajectory modification component 220 may send a signal to the trajectory modification component 220 to modify the main trajectory (or the contingent trajectory)

In some examples, even if a trajectory is invalid, the trajectory validation component 218 may cause the autonomous vehicle 102 to proceed along the trajectory. For instance, if the trajectory validation component 218 determines that a size of the object is smaller than a predetermined size (or is classified as a particular type of object, if such information is available), the trajectory validation component 218 may send a signal to the trajectory selection component 222 to proceed along the trajectory. To illustrate, the trajectory validation component 218 may determine that a trajectory will intersect a track of an object, but that the object is the size of a baseball. Here, it may be safer to continue along the trajectory than to decelerate, since the autonomous vehicle 102 would likely run over the object without any collision.

Further, in examples, the trajectory validation component 218 may determine if the primary system 106 is offline. For example, the trajectory validation component 218 may periodically, continuously, or at any time receive a signal from the primary system 106, a component of the primary system 106, and/or a service provider (e.g., remote device) indicating a status of hardware and/or software of the primary system 106. If the signal indicates a failure of the hardware and/or software of the primary system 106, the trajectory validation component 218 may determine that the primary system 106 is offline. Additionally, or alternatively, the trajectory validation component 218 may periodically, continuously, or at any time receive a signal from a battery of the autonomous vehicle 102 or other component associated with providing power indicating whether or not power is being provided to the primary system 106 (or a component of the primary system 106). If the signal indicates that power is not being provided to the primary system 106 (or a component of the primary system 106), the trajectory validation component 218 may determine that the primary system 106 is offline.

If the primary system 106 is offline, then the trajectory validation component 218 may send a signal to the trajectory modification component 220 instructing the trajectory modification component 220 to control the autonomous vehicle 102 to decelerate, stop, or perform another maneuver. In examples, the trajectory validation component 218 may send a previous trajectory to the trajectory modification component 220 (e.g., a last stored trajectory), since the primary system 106 is likely not currently outputting a trajectory. Alternatively, if the primary system 106 is online (and no collision is detected or other issues), the trajectory validation component 218 may send a signal to the trajectory selection component 222 to proceed along the trajectory.

The trajectory modification component 220 may modify a trajectory received from the primary system 106. For example, the trajectory modification component 220 may receive data from the localization component 214, data from the perception/prediction component 216 (e.g., secondary perception data, data indicating a track(s) of an object(s), etc.), and/or data from the estimation and validation component 210. If the trajectory modification component 220 receives a signal from the trajectory validation component 218 to decelerate or stop (or otherwise change a trajectory), the trajectory modification component 220 may process the data to determine a deceleration rate along the trajectory. The trajectory modification component 220 may then send a signal to the trajectory selection component 222 to decelerate along the trajectory (e.g., a modified trajectory). In some examples, such trajectory modification may also comprise adjusting steering angles and/or other controls to further adjust the trajectory. In at least some examples, such modifications may be to either a main trajectory and/or a contingent trajectory received from the primary system 106.

In one example, if the primary system 106 is offline, the trajectory modification component 220 may send a signal to the trajectory selection component 222 to perform a gentle stop maneuver. Here, the trajectory modification component 220 may determine a rate to decelerate to perform the gentle stop maneuver based on a current velocity of the autonomous vehicle 102. In another example, if a trajectory is invalid for a reason other than a collision, the trajectory modification component 218 may send a signal to the trajectory selection component 222 to perform a gentle stop maneuver. In yet another example, if a trajectory is invalid due to a detected collision, the trajectory modification component 220 may send a signal to the trajectory selection component 222 to perform a hard stop maneuver (e.g., come to a stop at a particular rate, which may be a maximum rate). Here, the trajectory modification component 220 may determine the deceleration rate based on a current velocity of the autonomous vehicle 102 and/or a distance to an object. The deceleration rate may enable the autonomous vehicle 102 to stop before colliding with the object. In a further another example, if a trajectory is invalid due to a detected collision, and a time to a last stop braking is far enough away (e.g., outside a window of time), the trajectory modification component 220 may send a signal to the trajectory selection component 222 to decelerate and/or may provide a warning signal to the primary system 106 of the detected collision (which may include detected objects, positions of the objects, etc.).

In some examples, a hard stop maneuver may take priority over other types of maneuvers. For instance, if a potential collision is detected, and a hard stop maneuver is initiated, the hard stop maneuver may take priority over any other maneuvers, such as a gentle stop maneuver that has already been initiated. To illustrate, assume that a gentle stop maneuver is initiated and, while implementing the gentle stop maneuver, an imminent collision is detected. Here, the trajectory modification component 220 may initiate a hard stop maneuver that overrides the gentle stop maneuver.

In some examples, the trajectory modification component 220 may generate a new trajectory for the autonomous vehicle 102. For example, based on a pose of the autonomous vehicle 102, perception data, etc., the trajectory modification component 220 may generate a trajectory that causes the autonomous vehicle 102 to pull over to a side of a road, to change lanes, and so on.

In examples, the trajectory selection component 222 may select a trajectory to send onto the system controller(s) 110. In one example, if the trajectory validation component 218 sends a signal to the trajectory selection component 222 indicating to use a trajectory from the primary system 106 (or sends the trajectory), the trajectory selection component 222 may send a signal (or the trajectory) to the system controller(s) 110 to use the trajectory. In another example, if the trajectory modification component 220 sends a signal to the trajectory selection component 222 to use a modified trajectory (or sends the modified trajectory), the trajectory selection component 222 may send a signal (or the modified trajectory) to the system controller(s) 110 to use the modified trajectory. The modified trajectory may represent a deceleration along a trajectory (e.g., main or contingent) provided by the primary system 106 and/or represent another maneuver. In yet another example, the trajectory selection component 222 may send a signal to the system controller(s) 110 to use another trajectory that is indicated or provided by the trajectory validation component 218 and/or the trajectory modification component 220.

In examples, the trajectory selection component 222 may send a signal or trajectory to the primary system 106. For instance, the trajectory selection component 222 may send a signal indicating that a modified trajectory was selected. This may inform the primary system 106 that there was a problem with the primary system (e.g., an invalid trajectory, etc.). Further, this may assist the primary system 106 in adjusting a course of the autonomous vehicle 102 (e.g., in cases where a modified trajectory is used to decelerate, but not come to a complete stop).

The system controller(s) 110 may control steering, propulsion, braking, safety, emitters, communication, and/or other systems of the autonomous vehicle 102. The system controller(s) 110 may communicate with and/or control corresponding systems of a drive system(s) and/or other components of the autonomous vehicle 102. In some instances, the system controller(s) 110 may translate a trajectory into instructions useable by a drive system(s) to cause the autonomous vehicle 102 to traverse the trajectory.

In some examples, the secondary system 108 or another system performs ground removal techniques on the sensor data 118. This may occur before the sensor data 118 is used by components of the secondary system 108. For example, the secondary system 108 may analyze LIDAR data or voxel data associated with the LIDAR data to determine if the LIDAR data or voxels represents a ground. In some instances, the ground may correspond to a surface that is drivable by a vehicle. In some examples, the secondary system 108 may determine an inner product between a vector in a height dimension (e.g., a reference direction) of an apparatus carrying a LIDAR system, and a normal vector (such as may be determined based on an Eigenvalue decomposition per voxel), expressed in a common coordinate system. In such an example, the inner product meeting or exceeding a threshold of about 15 degrees, for example, may indicate that the voxel does not comprise the ground. Whereas the inner product being less than the threshold, may indicate that the voxel comprises the ground. Further, in some examples, the secondary system 108 may cluster voxels that are determined to be locally flat voxels to grow a surface corresponding to the ground. In examples, once a ground surface is identified in sensor data, data associated with the ground surface may be removed from the sensor data and the remaining data may be processed (e.g., object detection, segmentation, classification, etc.). In some examples, the primary system 106, the secondary system 108, and/or another system may perform ground removal techniques discussed in U.S. patent application Ser. No. 15/622,905 entitled "Voxel Based Ground Plane Estimation and Object Segmentation" and filed Jun. 14, 2017, the entire contents of which are incorporated herein by reference.

The components of the primary system 106 and/or the secondary system 108 may represent hardware and/or software components. In the context of software, one or more of the components may include instructions that are executable by one or more processors. In context of hardware, one or more of the components may be implemented as integrated circuits (e.g., application-specific integrated circuits (ASICs), etc.), gate arrays (e.g., field-programmable gate arrays (FPGAs), etc.), and so on. In at least some examples, both hardware and software of the primary system 106 and the secondary system 108 may differ.

Figure 3:
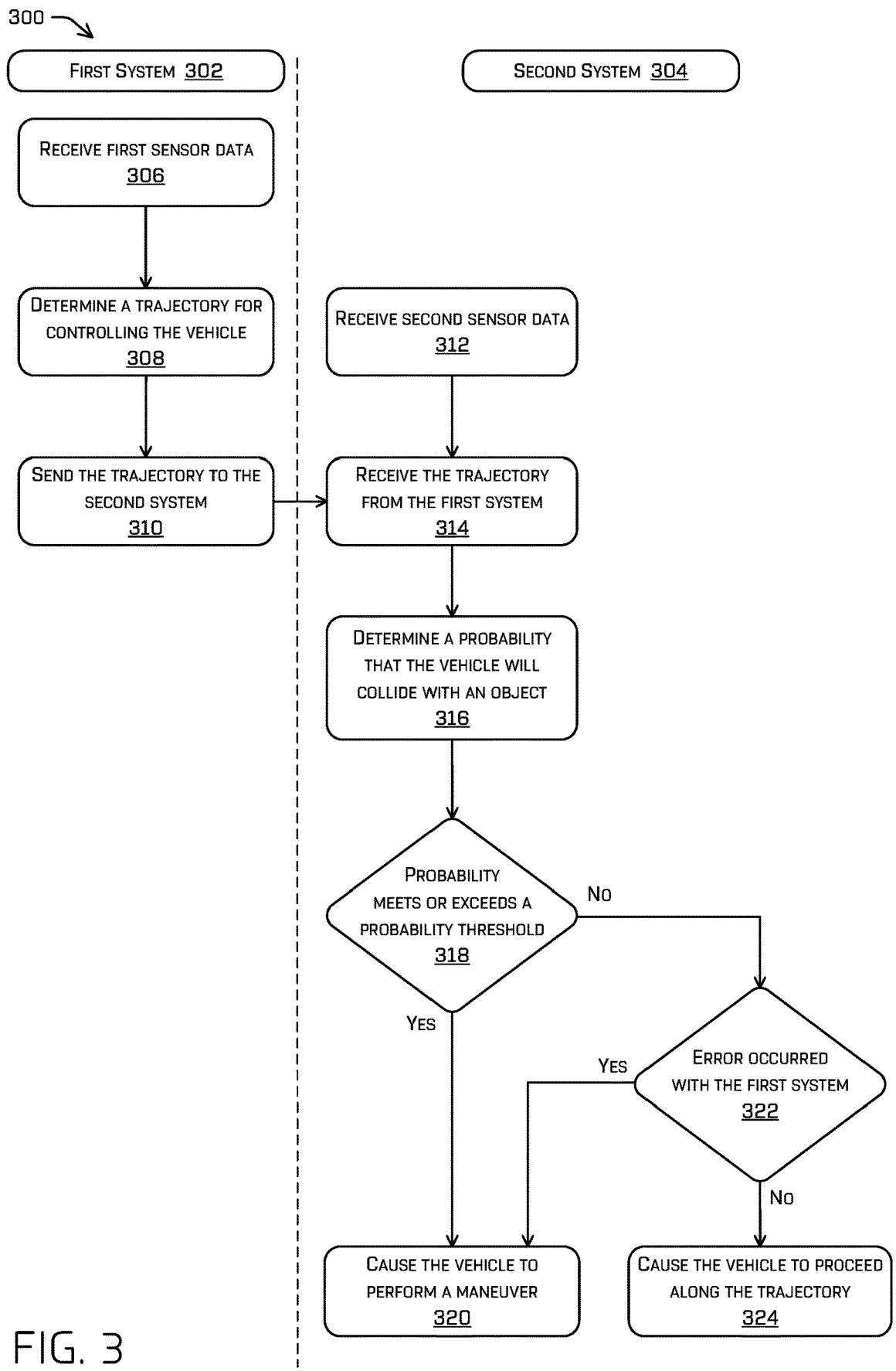
FIG. 3 depicts a flow diagram of an example process for determining whether or not to cause a vehicle to decelerate.
Figure 4:
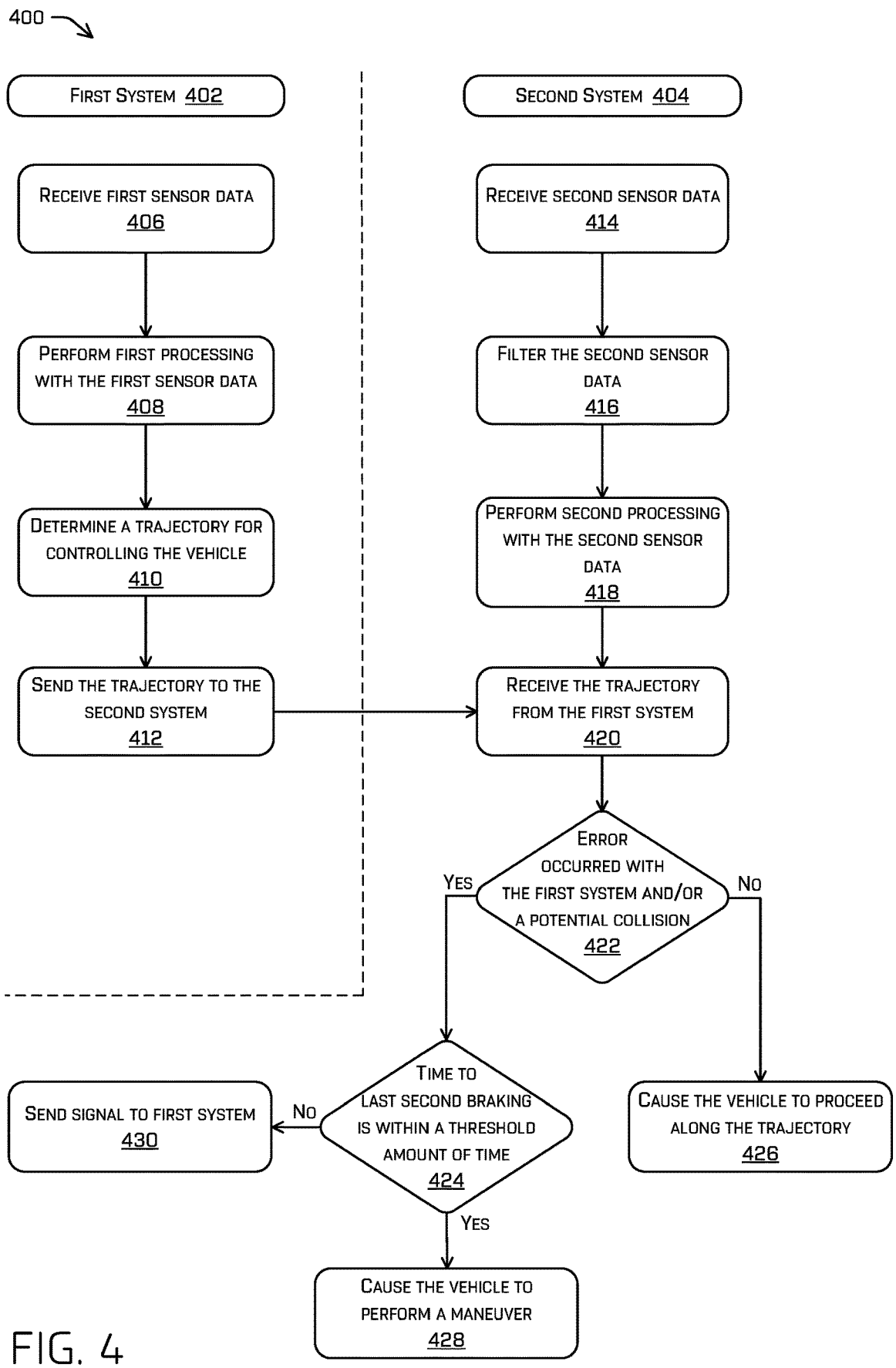
FIG. 4 depicts a flow diagram of another example process for determining whether or not to cause a vehicle to decelerate.

FIGS. 3 and 4 illustrate example processes 300 and 400 to perform the techniques discussed herein. The processes 300 and 400 are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. The processes 300 and/or 400 may be performed by any device or component, such as the autonomous vehicle 102, a service provider (e.g., a computing device of a service provider), or any other device.

FIG. 3 depicts a flow diagram of the example process 300 for determining whether or not to cause a vehicle to decelerate. For ease of illustration, the process 300 will be discussed as being performed by a first system 302 and a second system 304. For example, the first system 302 may comprise the primary system 106 of FIGS. 1 and 2, while the second system 304 may comprise the secondary system 108 of FIGS. 1 and 2.

In examples, the first system 302 may implement first techniques, such as a machine learned model, to perform first object detection, first object segmentation, first object classification, and/or first object tracking/prediction. In examples, the second system 304 may implement second techniques, such as a probabilistic model, to perform second object detection, second object segmentation, second object classification, and/or second object tracking/prediction. In some instances, the second techniques implement a Kalman filter and/or a particle filter.

At operation 306, the first system 302 may receive first sensor data. For example, the first system 302 may receive one or more of LIDAR data, RADAR data, image data, depth data (time of flight, structured light, etc.), etc. from a sensor(s) of a vehicle.

At operation 308, the first system 302 may determine a trajectory for controlling the vehicle. For example, the first system 302 may analyze the first sensor data to generate a trajectory for controlling the vehicle. In examples, the first system 302 may perform localization, perception, and/or prediction operations to generate the trajectory (which may include both a nominal trajectory and a contingent trajectory).

At operation 310, the first system 302 may send the trajectory (or trajectories) to the second system 304.

At operation 312, the second system 304 may receive second sensor data. For example, the second system 304 may receive one or more of LIDAR data, RADAR data, image data, depth data (time of flight, structured light, etc.), etc. from the sensor(s) of the vehicle. In some examples, the second sensor may include a subset of the first sensor data, such as LIDAR data, RADAR data, wheel encoder data, IMU data, GPS data, and/or time of flight data. In other examples, the second sensor data may be the same or include more data than the first sensor data.

At operation 314, the second system 304 may receive the trajectory (or trajectories) from the first system 302.

At operation 316, the second system 304 may determine a probability that the vehicle will collide with an object. For example, based on the trajectory and/or the second sensor data, the second system 304 may determine a probability that the trajectory of the autonomous vehicle will intersect with a track/trajectory of an object. As above, such determination may be, for example, based on straight-line (or more complex) physical models of the objects detected by the secondary system.

At operation 318, the second system 304 may determine if the probability meets or exceeds a probability threshold. If the second system 304 determines that the probability meets or exceeds the probability threshold (e.g., the "yes" path), the process 300 may proceed to operation 320. Alternatively, if the second system 304 determines that the probability does not meet or exceed the probability threshold (e.g., the "no" path), the process 300 may proceed to operation 322. In some examples, operation 318 may not determine probabilities at all. In such examples, operation 318 may determine whether the vehicle following the trajectory comes within a threshold distance of any of the detected objects.

At operation 322, the second system 304 may determine if an error occurred with the first system 302. For example, the second system 304 may determine that an error occurred with the first system 302 by determining that a signal has not been received from the first system 302 for more than a threshold amount of time, determining a hardware and/or software failure for the first system 302, and/or determining that power to the first system 302 was disrupted. Additionally, or alternatively, the second system 304 may determine that an error occurred with the first system 302 by determining that the trajectory is different than a previous trajectory by more than a threshold amount, determining that the trajectory is not compatible with a pose of the vehicle, determining that the trajectory is not compatible with a capability of the vehicle, and/or determining that the trajectory controls the vehicle to maneuver over a surface categorized as non-drivable.

If the second system 304 determines that an error occurred with the first system 302 (e.g., the "yes" path), the process 300 may proceed to the operation 320. Alternatively, if the second system 304 determines that an error did not occur with the first system 302 (e.g., the "no" path), the process 300 may proceed to operation 324.

At operation 320, the second system 304 may cause the vehicle to perform a maneuver, such as decelerate, stop, change lanes, pull over, swerve, or otherwise change the trajectory. For example, the second system 304 may send a signal to a system controller(s) to cause the vehicle to decelerate along the trajectory (e.g., a modified trajectory). In some examples, if the second system 304 determines that the probability meets or exceeds the threshold at the operation 318, the second system 304 may cause the vehicle to decelerate according to a hard stop maneuver (e.g., a maximum deceleration rate). Further, in some examples, if the second system 304 determines that the error occurred with the first system 302 at the operation 322, the second system 304 may cause the vehicle to decelerate according to a gentle stop maneuver (e.g., a rate that is less than a maximum deceleration rate). In some examples, a trajectory may be modified (either a nominal or contingent trajectory) before proceeding to operation 324.

At operation 324, the second system 302 may cause the vehicle to proceed along the trajectory. For example, the second system 302 may send a signal to the system controller(s) to cause the vehicle to move along the trajectory (e.g., without any modification to the trajectory).

FIG. 4 depicts a flow diagram of the example process 400 for determining whether or not to cause a vehicle to decelerate. For ease of illustration, the process 400 will be discussed as being performed by a first system 402 and a second system 404. For example, the first system 402 may comprise the primary system 106 of FIGS. 1 and 2, while the second system 404 may comprise the secondary system 108 of FIGS. 1 and 2.

At operation 406, the first system 402 may receive first sensor data. For example, the first system 402 may receive one or more of LIDAR data, RADAR data, image data, depth data (time of flight, structured light, etc.), etc. from a sensor(s) of a vehicle.

At operation 408, the first system 402 may perform first processing with the first sensor data. For example, the first system 402 may implement first techniques, such as a machine learned model (e.g., a neural network(s)), to perform first object detection to detect an object, first object segmentation to segment the first sensor data, first object classification to classify the object, and/or first object tracking/prediction to determine a current and/or predicted trajectory of the object. As such, the first system 402 may determine a first detection of the object.

At operation 410, the first system 402 may determine a trajectory for controlling the vehicle. For example, the first system 402 may generate a trajectory for controlling the vehicle based on the first sensor data and/or the first processing.

At operation 412, the first system 402 may send the trajectory to the second system 404.

At operation 414, the second system 404 may receive second sensor data. For example, the second system 404 may receive one or more of LIDAR data, RADAR data, image data, wheel encoder data, IMU data, GPS data, depth data (time of flight, structured light, etc.), etc. from the sensor(s) of the vehicle. In some examples, the second sensor may include a subset of the first sensor data. In other examples, the second sensor data may be the same or include more data than the first sensor data.

At operation 416, the second system 404 may filter the second sensor data. In one example, the second system 404 may remove data from the second sensor data that is outside a particular range. This may be based on a velocity or acceleration of the vehicle, a track and/or a predicted trajectory of an object, a velocity or acceleration of an object, etc. In another example, the second system 404 may remove data from the second sensor data based on a type of environment in which the vehicle is located. As such, the second system 404 may filter the second sensor data to determine a subset of the second sensor data.

At operation 418, the second system 404 may perform second processing with the second sensor data (e.g., in a filtered or unfiltered format). For example, the second system 404 may implement second techniques, such as a Kalman filter and/or a particle filter, to perform second object detection to detect an object, second object segmentation to segment the second sensor data, second object classification to classify the object, and/or second object tracking/prediction to determine a current and/or predicted track of the object. As such, the second system 404 may determine a second detection of the object. In examples, at the operation 418, the second system 404 may determine a velocity of the object, an acceleration of the object, a size of the object, an orientation of the object, and so on.

At operation 420, the second system 404 may receive the trajectory from the first system 402.

At operation 422, the second system 404 may determine if an error occurred with the first system 402 and/or there is a potential collision (e.g., the first system 402 missed detecting a collision). As such, at the operation 422, the second system 404 may determine if an error occurred. The operation 422 may be based on the second sensor data, the trajectory, and/or the second processing. If the second system 404 determines that an error occurred with the first system and/or a potential collision (the "yes" path), the process 400 may proceed to operation 424. Alternatively, if the second system 404 determines that an error did not occur with the first system and/or that there is no potential collision (the "no" path), the process 400 may proceed to operation 426.

At operation 424, the second system 404 may determine if a time to last second braking (TTLSB) for the object is within a threshold amount of time. As noted above, the time to last second braking is a last possible time when the vehicle needs to initiate a hard stop maneuver to avoid a collision. If the second system 404 determines that the time to last second braking is within the threshold amount of time (e.g., a number of seconds, milliseconds, etc. away from a current time) (the "yes" path), the process 400 may proceed to operation 428. Alternatively, if the second system 404 determines that the time to last second braking is not within the threshold amount of time (the "no" path), the process 400 may proceed to operation 430.

Although the operation 424 is illustrated in FIG. 4, in some examples the operation 424 may not be performed. For example, the process 400 may proceed along the "yes" path from the operation 422 to the operation 428.

At operation 428, the second system 404 may cause the vehicle to perform a maneuver, such as decelerate, stop, change lanes, pull over, swerve, or otherwise change the trajectory. For example, the second system 404 may send a signal to a system controller(s) to cause the vehicle to decelerate along the trajectory (e.g., a modified trajectory). In some examples, if the second system 404 determines a potential collision at operation 422, the second system 404 may cause the vehicle to decelerate according to a hard stop maneuver. Further, in some examples, if the second system 404 determines that an error occurred with the first system 402 at the operation 422, the second system 404 may cause the vehicle to decelerate according to a gentle stop maneuver. In examples, the second system 404 may cause the vehicle to decelerate at a rate that is based on a distance from the vehicle to an object.

At operation 430, the second system 404 may send a signal to the first system 402. The signal may indicate that the second system 404 will initiate a deceleration or other maneuver if a current trajectory is not modified. In examples, the signal may indicate when the time to last second braking is.

At operation 426, the second system 404 may cause the vehicle to proceed along the trajectory. For example, the second system 404 may send a signal to the system controller(s) to cause the vehicle to move along the trajectory (e.g., without any modification to the trajectory).

Figure 5:
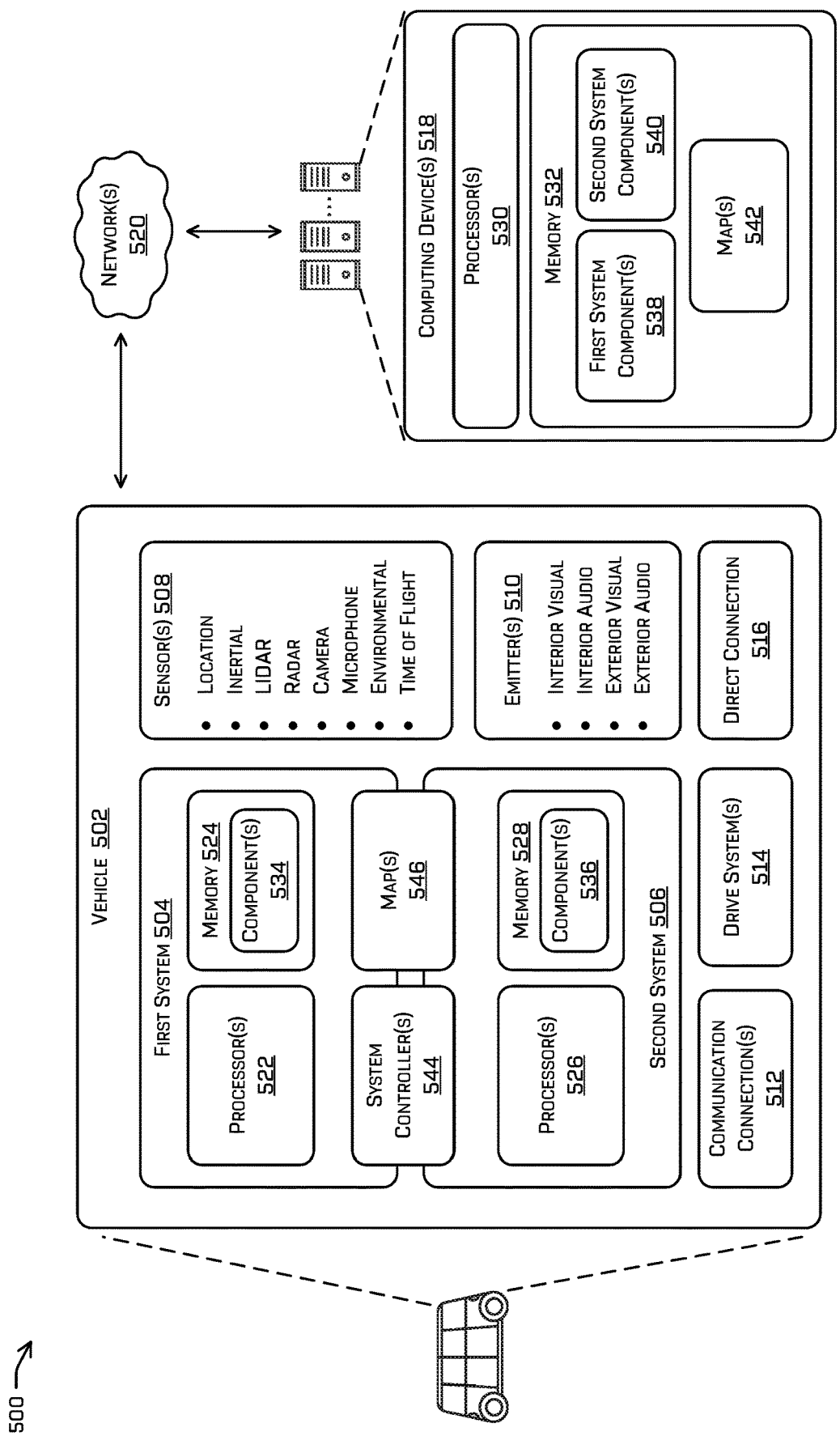
FIG. 5 depicts a block diagram of an example system for implementing the techniques described herein.

FIG. 5 depicts a block diagram of an example system 500 for implementing the techniques described herein. In some instances, the system 500 may include a vehicle 502, which may correspond to the autonomous vehicle 102 in FIG. 1. In some instances, the vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 502 may be a fully or partially autonomous vehicle having any other level or classification. Moreover, in some instances, the techniques described herein may be usable by non-autonomous vehicles as well.

The vehicle 502 may include a first system 504 (e.g., a first computing device), a second system 506 (e.g., a second computing device), one or more sensors 508, one or more emitters 510, one or more communication connections 512, one or more drive systems 514, and/or a direction connection 516 (e.g., for physically coupling the vehicle 502 to exchange data and/or to provide power).

In some instances, the sensor(s) 508 may include light detection and ranging (LIDAR) sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., red-green-blue (RGB), infrared (IR), intensity, depth, time of flight, etc.), microphones, wheel encoders, environment sensors (e.g., temperature sensors, humidity sensors, light sensors, pressure sensors, etc.), etc. The sensor(s) 508 may include multiple instances of each of these or other types of sensors. For instance, the LIDAR sensors may include individual LIDAR sensors located at the corners, front, back, sides, and/or top of the vehicle 502. As another example, the cameras may include multiple cameras disposed at various locations about the exterior and/or interior of the vehicle 502. The sensor(s) 508 may provide input to the first system 504 and/or the second system 506.

The vehicle 502 may also include the emitter(s) 510 for emitting light and/or sound, as described above. The emitter(s) 510 in this example may include interior audio and visual emitter(s) to communicate with passengers of the vehicle 502. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 510 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 502 may also include the communication connection(s) 512 that enable communication between the vehicle 502 and one or more other local or remote computing device(s). For instance, the communication connection(s) 512 may facilitate communication with other local computing device(s) on the vehicle 502 and/or the drive system(s) 514. Also, the communication connection(s) 512 may additionally or alternatively allow the vehicle 502 to communicate with other nearby computing device(s) (e.g., other nearby vehicles, traffic signals, etc.). The communication connection(s) 512 may additionally or alternatively enable the vehicle 502 to communicate with a computing device 518.

The communication connection(s) 512 may include physical and/or logical interfaces for connecting the first system 504 and/or the second system 506 to another computing device or a network, such as network(s) 520. For example, the communication connection(s) 512 may enable Wi-Fi-based communication such as via frequencies defined by the IEEE 800.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the first system 504, the second system 506, and/or the sensor(s) 508 may send sensor data, via the network(s) 520, to the computing device(s) 518 at a particular frequency, after a lapse of a predetermined period of time, in near real-time, etc.

In some instances, the vehicle 502 may include the drive system(s) 514. In some instances, the vehicle 502 may have a single drive system 514. In some instances, the drive system(s) 514 may include one or more sensors to detect conditions of the drive system(s) 514 and/or the surroundings of the vehicle 502. By way of example and not limitation, the sensor(s) of the drive system(s) 514 may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoders may be unique to the drive system(s) 514. In some cases, the sensor(s) on the drive system(s) 514 may overlap or supplement corresponding systems of the vehicle 502 (e.g., sensor(s) 508).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive system controller which may receive and preprocess data from the sensor(s) and to control operation of the various vehicle systems. In some instances, the drive system controller may include one or more processors and memory communicatively coupled with the one or more processors. The memory may store one or more modules to perform various functionalities of the drive system(s) 514. Furthermore, the drive system(s) 514 may also include one or more communication connection(s) that enable communication by the respective drive system with one or more other local or remote computing device(s).

The first system 504 may include one or more processors 522 and memory 524 communicatively coupled with the one or more processors 522. The second system 506 may include one or more processors 526 and memory 528 communicatively coupled with the one or more processors 526. The computing device(s) 518 may also include a processor(s) 530 and/or memory 532 communicatively coupled with the processor(s) 530. The processor(s) 522, 526, and/or 530 may be any suitable processor capable of executing instructions to process data and perform operations as described herein. By way of example and not limitation, the processor(s) 522, 526, and/or 530 may comprise one or more central processing units (CPUs), graphics processing units (GPUs), integrated circuits (e.g., application-specific integrated circuits (ASICs), etc.), gate arrays (e.g., field-programmable gate arrays (FPGAs), etc.), and/or any other device or portion of a device that processes electronic data to transform that electronic data into other electronic data that may be stored in registers and/or memory.

Memory 524, 528, and/or 532 may be examples of non-transitory computer-readable media. The memory 524, 528, and/or 532 may store an operating system and one or more software applications, instructions, programs, and/or data to implement the methods described herein and the functions attributed to the various systems. In various implementations, memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In examples, the memory 524 of the first system 504 may store one or more components 534. For example, the first system 504 may correspond to the primary system 106 of FIGS. 1 and 2 and store the localization component 202, the perception component 204, the prediction component 206, and/or the planning component 208. The processor(s) 522 may execute the one or more components 534 to cause the first system 504 to perform various actions discussed herein.

In examples, the memory 528 of the second system 506 may store one or more components 536. For example, the second system 506 may correspond to the secondary system 108 of FIGS. 1 and 2 and store the estimation and validation component 210, the data processing component(s) 212, the localization component 214, the perception/prediction component 216, the trajectory validation component 218, the trajectory modification component 220, and/or the trajectory selection component 222. The processor(s) 526 may execute the one or more components 536 to cause the second system 506 to perform various actions discussed herein.

Though depicted in FIG. 5 as residing in the memory 524 and/or the memory 528 for illustrative purposes, it is contemplated that the component(s) 534 and/or the component(s) 536 may additionally, or alternatively, be accessible to the computing device(s) 518 (e.g., stored remotely). For example, the memory 532 may store a first system component(s) 538 corresponding to at least a portion of the component(s) 534 and/or store a second system component(s) 540 corresponding to at least a portion of the component(s) 536. Additionally, or alternatively, the memory 532 may store one or more maps 542.

In at least one example, the first system 504 and/or the second system 506 may include one or more system controllers 544, which may be configured to control steering, propulsion, braking, safety, emitters, communication, and other systems of the vehicle 502. In examples, the system controller(s) 544 may be stored in the memory 524 and/or the memory 528. The system controller(s) 544 may communicate with and/or control corresponding systems of the drive system(s) 514 and/or other components of the vehicle 502. In some instances, the system controller(s) 544 may translate a trajectory generated by the first system 504, generated by the second system 506, and/or selected by the second system 506 into instructions useable by the drive system(s) 514 to cause the vehicle 502 to traverse the trajectory.

In some instances, the first system 504, the second system 506, the system controller(s) 544, and/or any component thereof may process sensor data, as described above, and may send their respective outputs, over the network(s) 520, to the computing device(s) 518 (e.g., at a particular frequency, after a lapse of a predetermined period of time, in near real-time, etc.)

The first system 504 and/or the second system 506 may store one or more maps 546, which may be used by the vehicle 502 to navigate within an environment. For the purpose of this discussion, a map may be any number of data features modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some instances, the map may be stored in a tiled format, such that individual tiles of the map represent a discrete portion of an environment, and may be loaded into working memory as needed. In some instances, the map may include an occupancy grid, point map, landmark map, and/or graph of pose constraints. In some instances, the vehicle 502 may be controlled based at least in part on the map(s) 546. That is, the map(s) 546 may be used in conjunction with a localization component of the first system 504 (and/or a localization component of the second system 506 in some examples) to determine a location of the vehicle 502, identify objects in an environment, and/or generate routes and/or trajectories to navigate within an environment.

In some instances, aspects of some or all of the components discussed herein may include any models, algorithms, and/or machine learning algorithms. For example, the component(s) 534 in the memory 524 (and/or the memory 528 or 532) may be implemented as a neural network.

It should be noted that while FIG. 5 is illustrated as a distributed system, in alternative examples, components of the vehicle 502 may be associated with the computing device(s) 518 and/or components of the computing device(s) 518 may be associated with the vehicle 502. That is, the vehicle 502 may perform one or more of the functions associated with the computing device(s) 518, and vice versa.

EXAMPLE CLAUSES

A. An example vehicle system comprises: one or more sensors; a first system comprising one or more first processors and one or more first memories comprising instructions that, when executed by the one or more first processors, cause the first processors to: receive first sensor data from a first subset of the one or more sensors; and determine, based at least in part on the first sensor data, a trajectory for controlling an autonomous vehicle; and a second system comprising one or more second processors and one or more second memories comprising instructions that, when executed by the one or more second processors, cause the one or more second processors to: receive the trajectory from the first system; receive second sensor data from a second subset of the one or more sensors; based at least in part on the trajectory and the second sensor data, determine a probability that the autonomous vehicle will collide with an object; determine that at least one of an error occurred with the first system or the probability meets or exceeds a probability threshold; and cause the autonomous vehicle to decelerate along the trajectory based at least in part on determining that the at least one of the error occurred with the first system or the probability meets or exceeds the probability threshold.

B. The vehicle system of example A, wherein: the first system implements a machine learned model to perform at least one of first object detection, first object segmentation, first object classification, or first object tracking, and the second system implements a probabilistic model to perform at least one of second object detection, second object segmentation, second object classification, or second object tracking.

C. The vehicle system of example A or B, wherein: determining that the at least one of the error occurred with the first system or the probability meets or exceeds the probability threshold comprises determining that the probability meets or exceeds the probability threshold; and causing the autonomous vehicle to decelerate comprises causing the autonomous vehicle to decelerate according to a maximum deceleration rate.

D. The vehicle system of any of examples A through C, wherein: determining that the at least one of the error occurred with the first system or the probability meets or exceeds the probability threshold comprises determining that the error occurred with the first system; and causing the autonomous vehicle to decelerate comprises causing the autonomous vehicle to decelerate at less than a maximum deceleration rate.

E. The vehicle system of any of examples A through D, wherein determining that the at least one of the error occurred with the first system or the probability meets or exceeds the probability threshold comprises determining that the error occurred with the first system by at least one of: determining that a signal has not been received from the first system for more than a threshold amount of time, determining at least one of a hardware or software failure for the first system, or determining that power to the first system was disrupted.

F. The vehicle system of any of examples A through E, wherein determining that the at least one of the error occurred with the first system or the probability meets or exceeds the probability threshold comprises determining that the error occurred with the first system by at least one of: determining that the trajectory is different than a previous trajectory by more than a threshold amount, determining that the trajectory is not compatible with a pose of the autonomous vehicle, determining that the trajectory is not compatible with a capability of the autonomous vehicle, or determining that the trajectory controls the autonomous vehicle to maneuver over a surface categorized as non-drivable.

G. An example method comprises: receiving, from a sensor and at a first system associated with a vehicle, sensor data; determining, based at least in part on the sensor data and by the first system, a first detection of an object in an environment proximate the vehicle; determining, based at least in part on a subset of the sensor data and by a second system associated with the vehicle, a second detection of the object; determining at least one of an error with the first system or a potential collision with the object; and causing, by the second system, the vehicle to decelerate along a trajectory based at least in part on determining at least one of the error with the first system or the potential collision with the object.

H. The method of example G, wherein: the first system implements a machine learned model to perform at least one of first object detection, first object segmentation, first object classification, or first object tracking, and the second system implements a probabilistic model to perform at least one of second object detection, second object segmentation, second object classification, or second object tracking.

I. The method of example G or H, wherein the second system implements at least one of a Kalman filter or a particle filter.

J. The method of any of examples G through I, wherein the subset of the sensor data comprises at least one of LIDAR data or RADAR data.

K. The method of any of examples G through J, wherein: determining the second detection of the object comprises determining at least one of a velocity of the object, an acceleration of the object, a size of the object, or an orientation of the object, and determining at least one of the error with the first system or the potential collision with the object is based on at least one of the velocity of the object, the acceleration of the object, the size of the object, or the orientation of the object.

L. The method of any of examples G through K, wherein: determining the second detection of the object comprises determining a current or predicted trajectory of the object, and determining at least one of the error with the first system or the potential collision with the object is based at least in part on the predicted trajectory of the object.

M. The method of any of examples G through L, wherein: determining at least one of the error with the first system or the potential collision with the object comprises determining the potential collision with the object; and causing the vehicle to decelerate comprises causing the vehicle to decelerate according to a maximum deceleration.

N. The method of any of examples G through M, wherein: determining at least one of the error with the first system or the collision with the object comprises determining the error with the first system; and causing the vehicle to decelerate comprises causing the vehicle to decelerate according to a deceleration less than a maximum deceleration.

O. One or more example non-transitory computer-readable media store instructions that, when executed, cause one or more processors of a second system to perform acts comprising: receiving sensor data from a sensor associated with a vehicle; receiving a trajectory from a first system associated with the vehicle; detecting, based at least in part on the sensor data, an object in an environment proximate the vehicle; determining at least one of an error with the first system or a potential collision with the object; and causing the vehicle to perform a maneuver based at least in part on determining at least one of the error with the first system or the potential collision with the object.

P. The one or more non-transitory computer-readable media of example O, wherein: the first system implements a neural network to perform at least one of first object detection, first object segmentation, first object classification, or first object tracking, and the second system performs at least one of second object detection, second object segmentation, second object classification, or second object tracking.

Q. The one or more non-transitory computer-readable media of example O or P, wherein: determining at least one of the error with the first system or the potential collision with the object comprises determining the potential collision with the object; and causing the vehicle to perform the maneuver comprises causing the vehicle to decelerate according to a maximum deceleration.

R. The one or more non-transitory computer-readable media of any of examples O through Q, wherein: determining at least one of the error with the first system or the potential collision with the object comprises determining the error with the first system; and causing the vehicle to perform the maneuver comprises causing the vehicle to decelerate according to a deceleration less than a maximum deceleration.

S. The one or more non-transitory computer-readable media of any of examples O through R, wherein the acts further comprise: based on at least one of a velocity of the object, an acceleration of the object, a velocity of the vehicle, or an acceleration of the vehicle, filtering the sensor data to determine a subset of the sensor data, wherein the detecting the object is based at least in part on the subset of the sensor data.

T. The one or more non-transitory computer-readable media of any of examples O through S, wherein causing the vehicle to perform the maneuver comprises causing the vehicle to decelerate at a rate that is based at least in part on a distance from the vehicle to the object.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A vehicle system comprising:
   one or more sensors;
   a first system comprising one or more first processors and one or more first memories comprising instructions that, when executed by the one or more first processors, cause the first processors to:
      receive first sensor data from a first subset of the one or more sensors; and
      determine, based at least in part on the first sensor data, a trajectory for controlling an autonomous vehicle; and
   a second system comprising one or more second processors and one or more second memories comprising instructions that, when executed by the one or more second processors, cause the one or more second processors to:
      receive the trajectory from the first system;
      receive second sensor data from a second subset of the one or more sensors;
      based at least in part on the trajectory and the second sensor data, determine a probability that the autonomous vehicle will collide with an object;
      determine that at least one of an error occurred with the first system or the probability meets or exceeds a probability threshold; and
      cause the autonomous vehicle to decelerate along the trajectory based at least in part on determining that the at least one of the error occurred with the first system or the probability meets or exceeds the probability threshold.

2. The vehicle system of claim 1, wherein:
   the first system implements a machine learned model to perform at least one of first object detection, first object segmentation, first object classification, or first object tracking, and
   the second system implements a probabilistic model to perform at least one of second object detection, second object segmentation, second object classification, or second object tracking.

3. The vehicle system of claim 1, wherein:
   determining that the at least one of the error occurred with the first system or the probability meets or exceeds the probability threshold comprises determining that the probability meets or exceeds the probability threshold; and causing the autonomous vehicle to decelerate comprises causing the autonomous vehicle to decelerate according to a hard stop rate.

4. The vehicle system of claim 1, wherein:
determining that the at least one of the error occurred with the first system or the probability meets or exceeds the probability threshold comprises determining that the error occurred with the first system; and
causing the autonomous vehicle to decelerate comprises causing the autonomous vehicle to decelerate at less than a hard stop rate.

5. The vehicle system of claim 1, wherein determining that the at least one of the error occurred with the first system or the probability meets or exceeds the probability threshold comprises determining that the error occurred with the first system by at least one of:
determining that a signal has not been received from the first system for more than a threshold amount of time,
determining at least one of a hardware or software failure for the first system, or
determining that power to the first system was disrupted.

6. The vehicle system of claim 1, wherein determining that the at least one of the error occurred with the first system or the probability meets or exceeds the probability threshold comprises determining that the error occurred with the first system by at least one of:
determining that the trajectory is different than a previous trajectory by more than a threshold amount,
determining that the trajectory is not compatible with a pose of the autonomous vehicle,
determining that the trajectory is not compatible with a capability of the autonomous vehicle, or
determining that the trajectory controls the autonomous vehicle to maneuver over a surface categorized as non-drivable.

7. A method comprising:
receiving, from a sensor and at a first system associated with a vehicle, sensor data;
determining, based at least in part on the sensor data and by the first system, a first detection of an object in an environment proximate the vehicle;
determining, based at least in part on a subset of the sensor data and by a second system associated with the vehicle, a second detection of the object;
determining at least one of an error with the first system or a potential collision with the object; and
causing, by the second system, the vehicle to decelerate along a trajectory based at least in part on determining at least one of the error with the first system or the potential collision with the object.

8. The method of claim 7, wherein:
the first system implements a machine learned model to perform at least one of first object detection, first object segmentation, first object classification, or first object tracking, and
the second system implements a probabilistic model to perform at least one of second object detection, second object segmentation, second object classification, or second object tracking.

9. The method of claim 7, wherein the second system implements at least one of a Kalman filter or a particle filter.

10. The method of claim 7, wherein the subset of the sensor data comprises at least one of LIDAR data or RADAR data.

11. The method of claim 7, wherein:
determining the second detection of the object comprises determining at least one of a velocity of the object, an acceleration of the object, a size of the object, or an orientation of the object, and
determining at least one of the error with the first system or the potential collision with the object is based on at least one of the velocity of the object, the acceleration of the object, the size of the object, or the orientation of the object.

12. The method of claim 7, wherein:
determining the second detection of the object comprises determining a current or predicted trajectory of the object, and
determining at least one of the error with the first system or the potential collision with the object is based at least in part on the current or predicted trajectory of the object.

13. The method of claim 7, wherein:
determining at least one of the error with the first system or the potential collision with the object comprises determining the potential collision with the object; and
causing the vehicle to decelerate comprises causing the vehicle to decelerate to a hard stop.

14. The method of claim 7, wherein:
determining at least one of the error with the first system or the potential collision with the object comprises determining the error with the first system; and
causing the vehicle to decelerate comprises causing the vehicle to decelerate to less than a hard stop.

15. The method of claim 7, wherein the second system is configured to override the first system causing the vehicle to decelerate along the trajectory.

16. One or more non-transitory computer-readable media storing instructions that, when executed, cause one or more processors of a second system to perform acts comprising:
receiving sensor data from a sensor associated with a vehicle;
receiving a trajectory from a first system associated with the vehicle;
detecting, based at least in part on the sensor data, an object in an environment proximate the vehicle;
determining an error with the first system; and
causing the vehicle to perform a maneuver based at least in part on determining the error with the first system.

17. The one or more non-transitory computer-readable media of claim 16, wherein:
the first system implements a neural network to perform at least one of first object detection, first object segmentation, first object classification, or first object tracking, and
the second system performs at least one of second object detection, second object segmentation, second object classification, or second object tracking.

18. The one or more non-transitory computer-readable media of claim 16, wherein:
determining of the error with the first system comprises determining a potential collision with the object; and
causing the vehicle to perform the maneuver comprises causing the vehicle to decelerate to a hard stop.

19. The one or more non-transitory computer-readable media of claim 16, wherein:
determining the error with the first system comprises determining the error with the first system; and
causing the vehicle to perform the maneuver comprises causing the vehicle to decelerate to a deceleration less than a hard stop.

20. The one or more non-transitory computer-readable media of claim 16, wherein the acts further comprise:

based on at least one of a velocity of the object, an acceleration of the object, a velocity of the vehicle, or an acceleration of the vehicle, filtering the sensor data to determine a subset of the sensor data, wherein the detecting the object is based at least in part on the subset of the sensor data.

21. The one or more non-transitory computer-readable media of claim 16, wherein causing the vehicle to perform the maneuver comprises causing the vehicle to decelerate at a rate that is based at least in part on a distance from the vehicle to the object.

* * * * *